US008131672B2

(12) United States Patent
Hind et al.

(10) Patent No.: US 8,131,672 B2
(45) Date of Patent: *Mar. 6, 2012

(54) SYSTEM AND METHOD FOR SYNCHRONIZING DATA RECORDS BETWEEN MULTIPLE DATABASES

(75) Inventors: Hugh Hind, Waterloo (CA); Craig A. Dunk, Guelph (CA)

(73) Assignee: Research In Motion Limited, Waterloo (CA)

(*) Notice: Subject to any disclaimer, the term of this patent is extended or adjusted under 35 U.S.C. 154(b) by 472 days.

This patent is subject to a terminal disclaimer.

(21) Appl. No.: 12/171,787

(22) Filed: Jul. 11, 2008

(65) Prior Publication Data
US 2008/0270486 A1 Oct. 30, 2008

Related U.S. Application Data

(63) Continuation of application No. 10/240,795, filed as application No. PCT/CA01/00488 on Apr. 10, 2001, now Pat. No. 7,496,606, which is a continuation-in-part of application No. 09/545,964, filed on Apr. 10, 2000, now Pat. No. 6,820,088.

(51) Int. Cl.
*G06F 17/30* (2006.01)
(52) U.S. Cl. ........ 707/610; 707/611; 707/614; 707/618; 707/621; 707/629
(58) Field of Classification Search ..................... None
See application file for complete search history.

(56) References Cited

U.S. PATENT DOCUMENTS

| 5,649,195 | A | * | 7/1997 | Scott et al. ........................... 1/1 |
| 5,684,990 | A | * | 11/1997 | Boothby .............................. 1/1 |
| 5,806,074 | A | | 9/1998 | Souder et al. |
| 5,878,434 | A | | 3/1999 | Draper et al. |
| 5,924,094 | A | | 7/1999 | Sutter |
| 5,924,096 | A | | 7/1999 | Draper et al. |
| 5,926,816 | A | | 7/1999 | Bauer et al. |
| 5,943,676 | A | | 8/1999 | Boothby |

(Continued)

OTHER PUBLICATIONS

Ganeriwal et al.: "Timing-Sync Protocol for Sensor Networks," SenSys '03, Nov. 5-7, 2003, ISBN: 1-58113-707-9, pp. 138-149, Los Angeles, California, USA.

(Continued)

*Primary Examiner* — Baoquoc To
(74) *Attorney, Agent, or Firm* — Jones Day

(57) ABSTRACT

A system and method for synchronizing data records between multiple databases is provided. Each database includes data records that are modified to include at least one pair of synchronization parameters. In a two-database system including a first database and a second database, each data record is modified to include synchronization parameters for both the first and second databases. When an update is made to a data record at one of the databases, an update message is transmitted to the other database including both synchronization parameters from the database where the update is made, along with the updated data record. An efficient master-slave configuration between the databases then enables either database to resolve conflicts without further communications. The system and method scale to systems having more than two databases by modifying the data records in at least one of the databases to include a pair of synchronization parameters for each of the other databases to which it is being synchronized, and by providing a multi-level master-slave configuration. The system and method permits the ability to add and delete records and to securely communicate between all synchronized databases.

20 Claims, 28 Drawing Sheets

U.S. PATENT DOCUMENTS

| | | | |
|---|---|---|---|
| 6,000,000 | A | 12/1999 | Hawkins et al. |
| 6,034,621 | A | 3/2000 | Kaufman |
| 6,141,664 | A | 10/2000 | Boothby |
| 6,202,060 | B1 | 3/2001 | Tran |
| 6,247,135 | B1 | 6/2001 | Feague |
| 6,295,541 | B1 | 9/2001 | Bodnar et al. |
| 6,308,201 | B1 | 10/2001 | Pivowar et al. |
| 6,373,834 | B1 | 4/2002 | Lundh et al. |
| 6,463,427 | B1 | 10/2002 | Wu |
| 6,466,609 | B2 | 10/2002 | Koslar et al. |
| 6,493,727 | B1 | 12/2002 | Huang et al. |
| 6,516,327 | B1 | 2/2003 | Zondervan et al. |
| 7,069,433 | B1 * | 6/2006 | Henry et al. .......... 713/151 |
| 7,219,225 | B2 * | 5/2007 | Rhodes .......... 713/153 |
| 7,788,709 | B1 * | 8/2010 | Henry et al. .......... 726/6 |
| 2003/0140050 | A1 | 7/2003 | Li et al. |
| 2010/0299523 | A1 * | 11/2010 | Henry et al. .......... 713/168 |

OTHER PUBLICATIONS

Tyukin et al.: "On the Choice of Coupling in a System of Coupled Maps: Structured Implies Features," PhysCon 2003, Aug. 20-22, 2003, vols.-2, pp. 555-562, St. Petersburg, Russia.

Panayiotopoulos: "Unified Algebraic Treatment of Synchronization Parameters Estimation," Jun. 11-14, 2004, vol.-8, pp. 2530-2534, Peania Attika, Greece.

Kanbara et al.: "A Stereoscopic Video See-Through Augmented Reality System Based on Real-Time Vision-Based Registration," Mar. 18-22, 2000, pp. xx-302 (8 pgs), Nara, Japan.

CIPO: Office Action issued Jun. 26, 2008 for Canadian Patent Application 2505885 (2 pgs).

* cited by examiner

SYSTEM AND METHOD FOR SYNCHRONIZING DATA RECORDS BETWEEN MULTIPLE DATABASES

CROSS-REFERENCE TO RELATED APPLICATIONS

This is a continuation of U.S. patent application Ser. No. 10/240,795 now U.S. Pat. No. 7,496,606, filed Jan. 29, 2003, which is the U.S. national-stage application of International Patent Application No. PCT/CA01/00488, filed on Apr. 10, 2001. International Patent Application No. PCT/CA01/00488 claims priority from U.S. Pat. No. 6,820,088, filed on Apr. 10, 2000. This application is also related to U.S. patent application Ser. No. 10/990,014, filed on Nov. 16, 2004, which also claims priority from U.S. Pat. No. 6,820,088. Each of these prior applications are incorporated herein by reference in their entirety.

BACKGROUND OF THE INVENTION

1. Technical Field

The present invention is directed toward the field of synchronizing data records stored in a plurality of electronic databases. More specifically, the invention provides a system and method for synchronizing data records between multiple databases in which a plurality of synchronization parameters are appended to data records stored in the databases so that synchronization and subsequent conflict resolution processes can be accomplished in an efficient manner. The invention is particularly useful in a wireless communication environment in which data records are synchronized between one or more host systems coupled to a wired network and one or more portable data communication device coupled to a wireless network, or between multiple communication devices.

2. Description of the Related Art

Data record synchronization systems are known in this field. Generally, these systems utilize a single "change number" for maintaining synchronicity between data records stored on multiple databases. The change number is initially synchronized to a particular value (such as 1) when the records are stored to the databases. If the record is changed at one of the databases, the change number at that database is incremented, and a message is sent to the other databases indicating that a change has occurred to the particular data record.

The problem with these known synchronization systems is that when a conflict occurs (i.e., the same data record is simultaneously updated at more than one database), there must be multiple (usually at least three) exchanges of information between the databases in order to resolve the conflict. For example, consider a typical synchronization process between two databases—A and B. A data record is updated at database A. Database A then transmits an update message to database B indicating that the particular record has been updated. Database B examines the update message (which typically includes the change number associated with the data record at database A, and the new data record), and either accepts the update or rejects it depending upon whether a conflict has occurred. If database B accepts the update, then it sends an acknowledgement message back to database A indicating the change has been accepted. It database B rejects the update, then a negative acknowledgement message is sent to database A. Database A then sends a formal acknowledgement back to database B indicating that it received the message from database B. This typifies the traditional three-way handshake used in present synchronization systems.

This type of synchronization process is particularly problematic in the wireless field where high transmission latency is the norm, and thus conflicts between databases are very likely. For this type of system, the standard three-way synchronization process is inefficient and inadequate for maintaining synchronicity between data records, and for resolving conflicts between multiple updates to the same data record.

Therefore, there remains a general need in this field for a system and method for synchronizing data records between multiple databases in which conflicts can be efficiently resolved.

SUMMARY OF THE INVENTION

A system and method for synchronizing data records between multiple databases is provided. Each database includes data records that are modified to include at least one pair of synchronization parameters. In a two-database system including a first database and a second database, each data record is modified to include synchronization parameters for both the first and second databases. When an update is made to a data record at one of the databases, an update message is transmitted to the other database including both synchronization parameters from the database where the update is made, along with the updated data record. An efficient master-slave configuration between the databases then enables either database to resolve conflicts without further communications. The system and method scale to systems having more than two databases by modifying the data records in at least one of the databases to include a pair of synchronization parameters for each of the other databases to which it is being synchronized, and by providing a multi-level master-slave configuration.

Conflicts that occur during the synchronization process are resolved in the present invention without user interaction using an efficient "one side wins" model in which one of the databases is selected as the "master" database, and the remaining databases are "slaves" to changes that occur at the master. For systems with more than two databases taking part in the synchronization method, multiple levels of "slave" databases may be implemented.

According to one aspect of the invention, a method of synchronizing data records stored in a first and second database is provided. The method includes the following steps: (1) associating a pair of synchronization parameters with each data record stored in the first and second databases, the pair including a first synchronization parameter associated with the first database, and a second synchronization parameter associated with the second database; (2) updating a data record at the first database; (3) incrementing the first synchronization parameter associated with the updated data record at the first database; (4) transmitting a first update message from the first database to the second database, the first update message including the incremented first synchronization parameter, the second synchronization parameter, and the updated data record from the first database; (5) receiving the first update message at the second database; and (6) updating the data record at the second database using the information from the first update message.

According to another aspect of the invention, a method of synchronizing data records stored in a host system and a portable communication device is provided, comprising the steps of: associating a first device synchronization parameter and a first host synchronization parameter with the data records stored at the host system; associating a second device synchronization parameter and a second host synchronization parameter with the data records stored at the device; if a data record is updated at the host system, then updating the first host synchronization parameter, and transmitting a first update message to the device; and if a data record is updated at the device, then updating the second device synchronization parameter, and transmitting a second update message to the host.

Another aspect of the invention provides a data record synchronization system, comprising: a host system coupled to a host database, wherein the host database stores data records that have been modified to include a first host synchronization parameter and a first device synchronization parameter; a portable communication device coupled to a device database, wherein the device database stores data records that have been modified to include a second host synchronization parameter and a second device synchronization parameter; a network coupling the host system to the portable communication device; software operating at the host system for updating a data record and for generating a first update message that is transmitted to the device when a data record is updated at the host, the first update message including the first host synchronization parameter, the first device synchronization parameter, and the updated data record stored at the host system; and software operating at the portable communication device for updating a data record and for generating a second update message that is transmitted to the host when a data record is updated at the device, the second update message including the second host synchronization parameter, the second device synchronization parameter, and the updated data record stored at the device.

It should be noted that these are just some of the many aspects of the present invention. Other aspects not specified will become apparent upon reading the detailed description of the preferred embodiments, set forth below. The following drawings and description of the preferred embodiments are to be regarded as illustrative in nature and not restrictive.

DETAILED DESCRIPTION OF THE DRAWINGS

Figure 1:
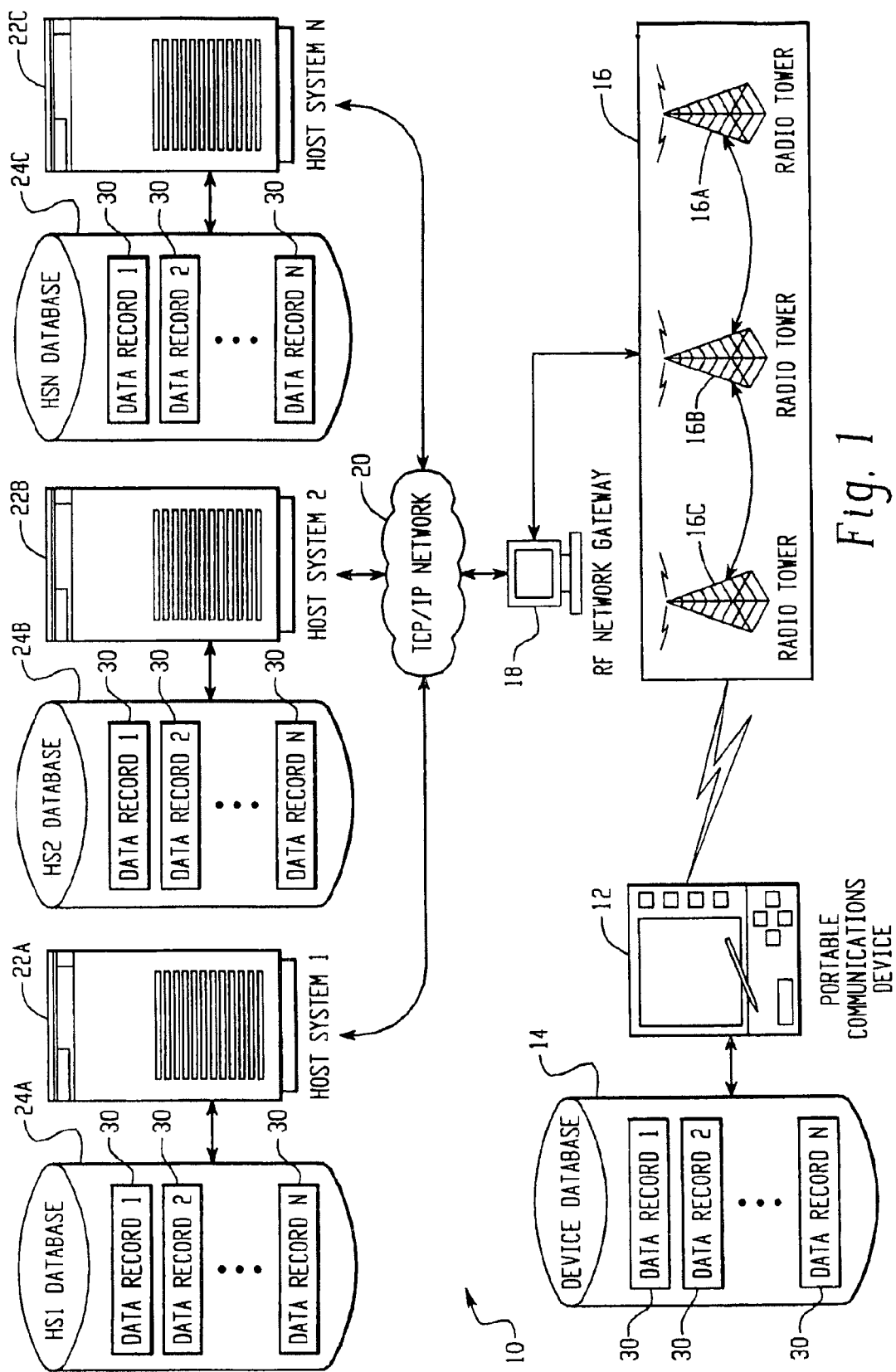
FIG. 1 is a diagram of a preferred system for synchronizing data records between a plurality of host systems and a portable communication device via a wireless network.

Turning now to the drawing figures, FIG. 1 is a diagram of a preferred system 10 for synchronizing data records between one or more host systems ("hosts") 22A, 22B, 22C and a portable communication device ("device") 12 via a wireless network. Each of the host systems 22A, 22B, and 22C include a corresponding host database 24A, 24B, and 24C. A plurality of data records 30 are stored within these host databases 24A, 24B, 24C. Likewise, the portable communication device 12 includes a device database 14 preferably comprising the same data records 30 that are stored within the one or more host system databases 24A, 24B, 24C.

In the preferred environment shown in FIG. 1, the one or more host systems 22A, 22B, 22C are in communication with the portable communications device 12 via a wide area network 20, preferably based on TCP/IP (Transmission Control Protocol/Internet Protocol), such as the Internet, and a wireless communication network 16, commonly referred to herein as a radio or RF (radio frequency) network 16. The radio network 16 preferably includes a plurality of radio towers 16A, 16B, 16C, base station electronics, control centers, etc., for communicating RF messages to and from the portable communications device 12. An example of such an RF network is the Mobitex™ packet data radio network, although the principles of the present invention can be used with any type of wireless or wireline network in which it is desirable to synchronize data records between multiple databases. Because of the latency involved in communications over a wireless network however, the present invention is particularly useful in this environment. The radio network 16 is coupled to the TCP/IP network 20 via an RF network gateway 18, which provides a two-way interface between the two networks 20, 16.

The portable communication device 12 can take many forms. A preferred form of the device is a two-way paging communicator, such as disclosed in Canadian Patent application 2,276,697, titled "Hand-Held Electronic Device With A Keyboard Optimized For Use With The Thumbs", filed on Jun. 28, 1999 and assigned to the assignee of the present invention. Although a two-way communication device is preferred, any type of remote computing device having a database can be used with the present invention, whether the device is wireless or not. The device may also be enabled for other types of communications, including voice communications for example, in addition to data communication functionality. Example devices that may be utilized with the present invention include: one, one-and-one-half, and two-way pagers, PDAs, palmtop computers, laptop computers, cell-phones, web-phones, electronic tablets, thin clients, net appliances, and the like.

As shown in FIG. 1, and described in more detail below, a system 10 in accordance with an embodiment of the present invention preferably includes hardware, software and data structures for enabling the synchronization of data records between a plurality of databases. In the system 10, the hardware includes at least one host system 22A coupled to a host database 24A and at least one portable communication device 12 coupled to a device database 14. Associated data structures including a plurality of modified data records 30 are stored in the databases 24A, 14. Software executing at the portable device 12 and the host system 24A enables the data record synchronization and conflict resolution processes described below in connection with FIGS. 3-9.

Figure 2:
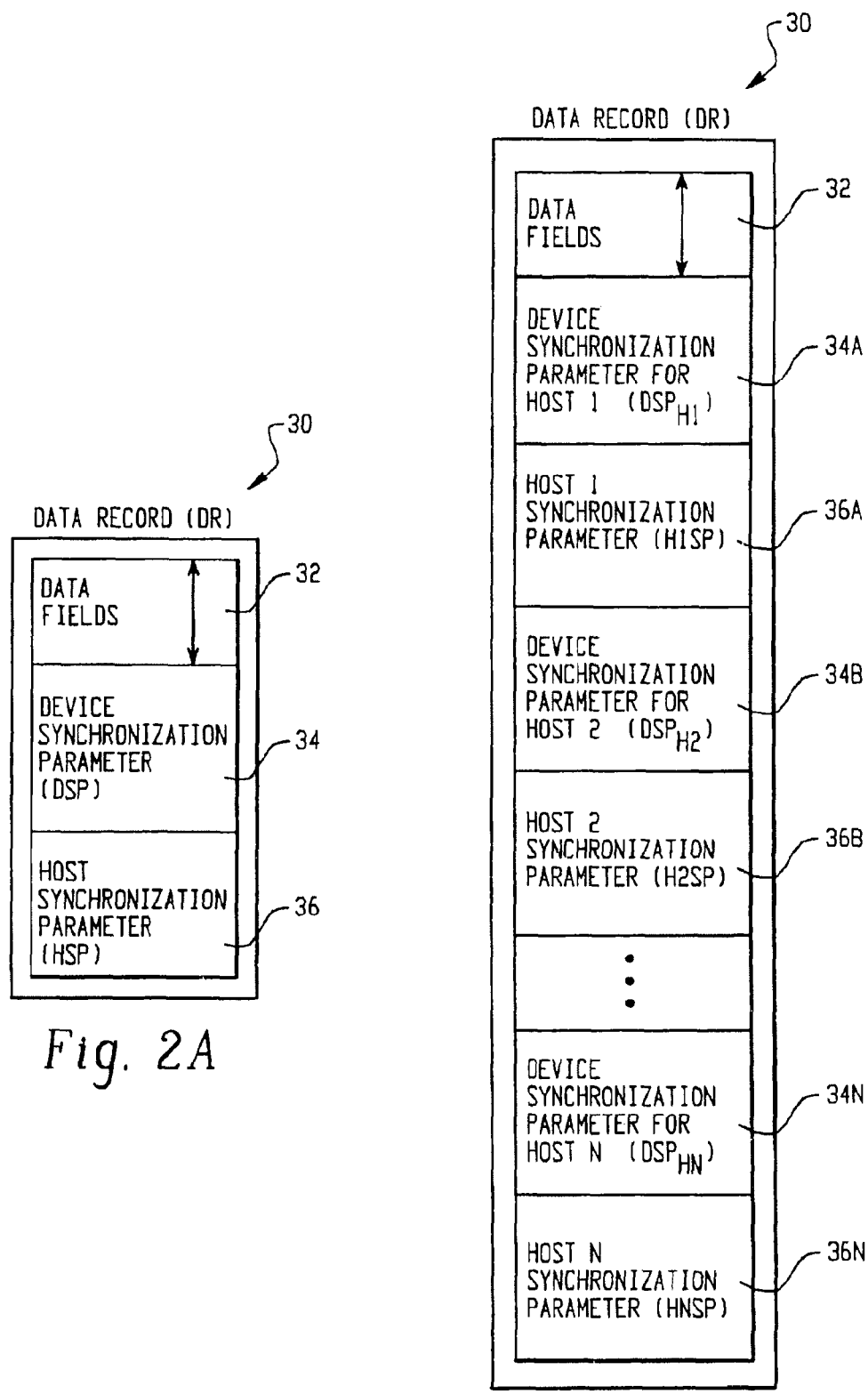
FIG. 2A is a schematic of a data record modified to operate in accordance with an embodiment of the present invention in which data records are synchronized between one host system and a portable communication device.
FIG. 2B is a schematic of a data record modified to operate in accordance with another embodiment of the present invention in which data records are synchronized between a plurality of host systems and a portable communication device.

FIG. 2A is a schematic of a data record ("DR") 30 modified to operate in accordance with an embodiment of the present invention in which data records are synchronized between one host system 22A and a portable data communication device 12. These data records (DR) are stored in the host database 24A and the device database 14, and include a plurality of data fields 32. For example, the database could be an electronic calendar database, as is commonly associated with calendar software such as Microsoft Outlook™ and Lotus Organizer™. The data records (DR) represent individual calendar entries in this example, and the data fields represent the specific information associated with the particular calendar entry.

In this example, the user of the device 12 may be updating the calendar entries (i.e., data records) at the device database 14 while on the road away from their office computer (i.e., host system 22A), and at the same time the user's assistant may be making updates to the calendar entries at the host database 24A. As described in more detail below in connection with FIGS. 3-9, an aspect of the present invention provides a mechanism for ensuring that the correct calendar entries are synchronized between the host system and the device, even in the situation where there are multiple (and near simultaneous) updates to the same data record.

As shown in FIG. 2A, one embodiment of the present invention includes a modified data record structure 30 stored at the host system database 24A and the device database 14. This modified data record structure 30 includes a plurality of data fields 32, which are the same data fields that are normally associated with the unmodified data record, and at least two synchronization parameters that are appended to the data record—a device synchronization parameter (DSP) 34, and a host synchronization parameter (HSP) 36. Data records that are intended to be synchronized by the system 10 are modified to include the DSP 34 and HSP 36. The modification of data records is preferably performed automatically on both the device 12 and each host system 22, by device and host system software components implementing a synchronization method according to an embodiment of the invention. The DSP 34 is a parameter, associated with the device, which keeps track of the current version of the modified data record 30 stored at the device database 14. Likewise, the HSP 36 is a parameter, associated with the host 22A, which keeps track of the current version of the modified data record 30 stored at the host database 24A. Preferably, these parameters DSP 34, HSP 36 are integer counters that are initialized to the value "1" when the data record 30 is first created and synchronized between the host 22A and the device 12.

Having established this modified data structure 30, whenever the data record is updated at the device 14, the appended DSP 34 is incremented, by "1" for example. Likewise, if the data record 30 is updated at the host system 22A, then the HSP 36 is incremented by "1". As described in more detail below, when either the device 14 or the host 22A makes an update to a particular data record 30, an update message is transmitted in order to synchronize the device 12 to the host system 22A, or vice versa. This update message would include the current DSP, HSP, and the updated data record 30. By utilizing a plurality of synchronization parameters, data record synchronization requires only a single communication between the databases being synchronized.

FIG. 2B is a schematic of a data record modified to operate in accordance with another embodiment of the present invention in which data records 30 are synchronized between a plurality of host systems 22A, 22B, 22C and a portable data communication device 12. Unlike FIG. 2A, however, this modified data record 30 has a different structure depending upon whether it is stored at one of the host systems 22A, 22B, 22C or the device 12. FIG. 2B shows the structure of the modified data record 30 stored at the device 12. Because in this embodiment the device 12 is being synchronized to multiple host systems 22A, 22B, 22C, the data record 30 is modified to include a DSP/HSP pair 34, 36 for each host system.

Thus, for example, if the device 12 is being synchronized to two host systems (host 1 and host 2), the modified data record 30 stored at the device would include a device synchronization parameter for host 1 ($DSP_{H1}$) 34A, a host 1 synchronization parameter (H1SP) 36A, a device synchronization parameter for host 2 ($DSP_{H2}$) 34B, and a host 2 synchronization parameter (H2SP) 36B. The synchronization pair $DSP_{H1}$/H1SP are used to synchronize the device 12 to host 1, and the synchronization pair $DSP_{H2}$/H2SP are used to synchronize the device to host 2.

For such a two host system—host 1 and host 2—the modified data record would include only the synchronization pair associated with the particular host system. Thus, for example, the modified data record stored at host 1 would include only the synchronization pair $DSP_{H1}$/H1SP appended to the data fields, and would not need the synchronization pair for host 2—$DSP_{H2}$/H2SP. However, it is also contemplated that the longer data record, including a synchronization parameter pair for each host system with which a data record is to be synchronized, may be stored at a host system instead of at a device, since the host systems typically have more memory space than portable communication devices.

Figure 3:
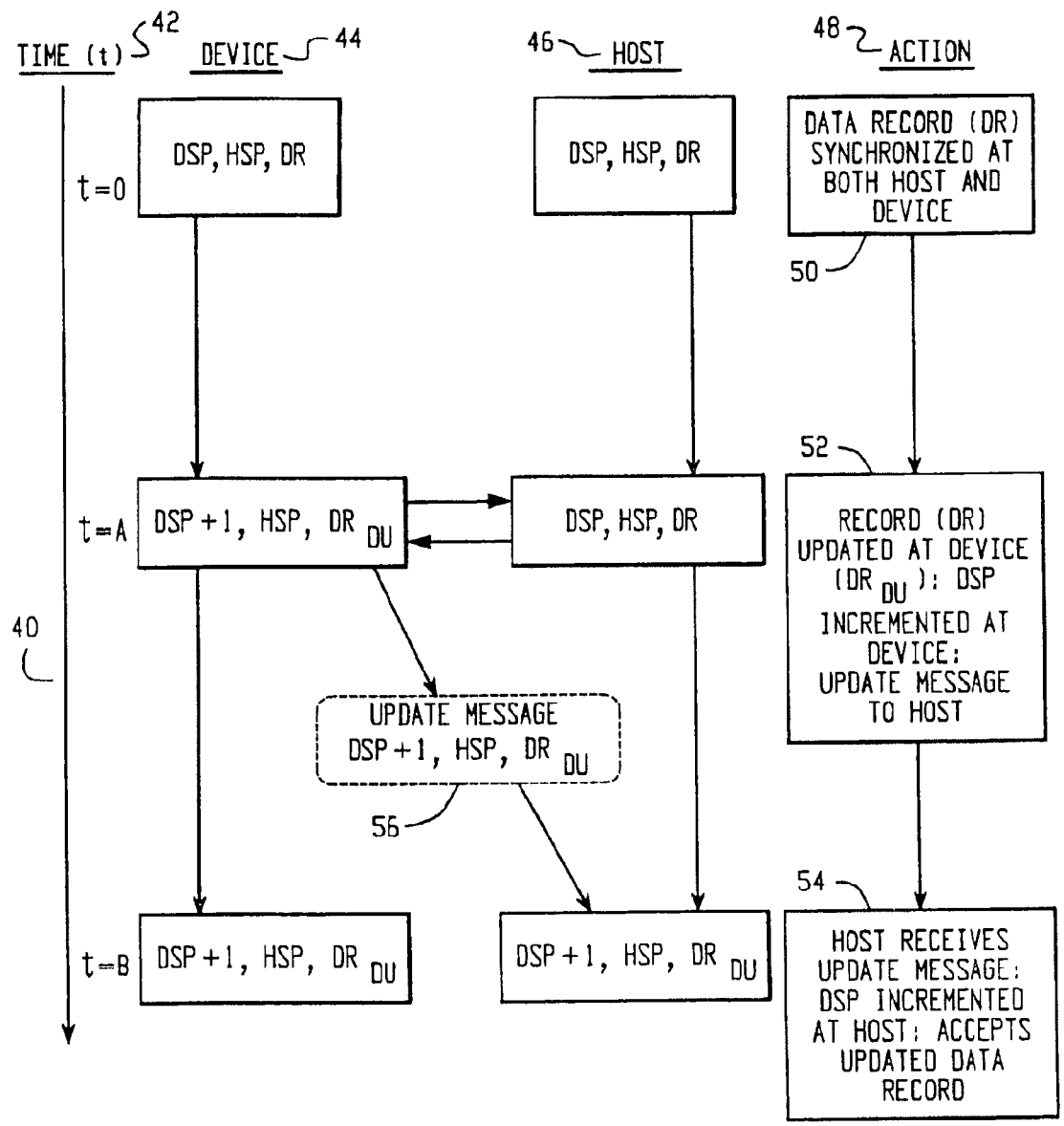
FIG. 3 is a timing flow diagram showing a method of data record synchronization between a host system and a portable communication device, wherein the data record is updated at the portable communication device.

FIG. 3 is a timing flow diagram 40 showing a method of data record synchronization between a single host system 22A and a portable data communication device 12, wherein the modified data record 30 is updated at the portable data communication device 12.

The structure of all the timing flow diagrams in this application include three columns organized into a plurality of rows. The first column 44 shows the modified data record 30 at the device database 14 and the second column 46 shows the modified data record 30 at the host system database 24A. The third column 48 describes the actions taken, by the synchronization software operating at the host system 22A and the device 12 for example, during the synchronization and conflict resolution processes described below. A timing scale 42 is set forth on the left-hand side of the flow diagrams, and is organized from top to bottom, such that the flow of actions taken and the corresponding status of the modified data records begins at the top of each Figure, where t=0, and proceeds towards the bottom of the Figure, where t=B or t=C.

In FIG. 3, at step 50 the modified data record 30 to be updated is synchronized at both the host 22A and the device 14. This record 30 may have been previously synchronized between the host 22A and the device 14 using a wired synchronization cradle for example, as is commonly used in synchronizing portable devices to host systems, or it may instead have been synchronized by a wireless transmission.

At time t=0, the device 12 and host 22A both store the same device synchronization parameters (DSP), host synchronization parameters (HSP), and data record fields (DR). At time t=A, the data record is updated at the device 12. When this happens, the device 12 or software operating at the device 12 creates a new, updated version of the data record by modifying or adding to the data fields 32 in some manner, thereby creating an updated data record—$DR_{DU}$. At the same time, the DSP is incremented at the device so that it is now the value DSP+1. Whenever a data record is updated at the device (or at the host), an update message is generated, preferably by the synchronization software. As shown at time t=A in FIG. 3, when the record is updated at the device 12 to $DR_{DU}$, the device software then generates an update message 56, including the updated DSP parameter (DSP+1), the HSP parameter (HSP), and the updated data record ($DR_{DU}$).

Since the update message 56 is transmitted to the host system 22A through different networks, the wireless network 16 and TCP/IP network 20 in the example system of FIG. 1, routing information and communication protocols may change during transmission of the update message 56 to the host system 22A. At the device, the update message is therefore preferably repackaged into an outer "envelope" which provides all routing information necessary to transmit the update message from the device 12 to the gateway 18 via the wireless network 16 and conforms to any predetermined protocols governing communications over the wireless network 16. The update message itself is preferably not changed. The data fields and any synchronization parameters remain intact—the entire message is repackaged in the outer envelope. The gateway 18, upon receiving such a repackaged update message, then strips away the wireless network envelope and again repackages the update message for sending through the network 20 to the host system 22A. As with the device repackaging of the update message, the repackaging operations at the gateway 18 do not change the contents of the update message. The wireless network envelope is stripped away and the original update message is repackaged into a new TCP/IP outer envelope. When the twice-repackaged update finally arrives at the host 22A, the host strips away the TCP/IP network envelope to recover the update message.

Similar repackaging of update messages and any other data record command messages is performed at a host system and gateway for transmission of such messages to a device.

The data records in any of the databases shown in FIG. 1 may include sensitive information, for example in a corporate or other local area network in which the host systems 22 are arranged to operate. A user of a stand-alone host system may also prefer that data records are not accessible outside the synchronized databases. It is therefore contemplated that all update messages, as well as any other data record command messages, will be encrypted before transmission, whether the update message is being transmitted from a device to a host or from a host to a device. An encryption scheme is therefore preferably implemented between each host and any device with which the host communicates. In a private key encryption scheme, the device and all hosts communicating with the device share a key with which encrypted messages may be decrypted. Public key encryption involves encrypting a message with a publicly available encryption key associated with the message addressee. A resultant encrypted message may only be decrypted using a private key held by the addressee. Public or private key encryption may be implemented within a synchronization system according to the invention. Since update messages and any other data record related command messages are repackaged at the host, device and gateway without regard to message content, an encrypted message remains encrypted between a host and device. Unlike known encryption schemes, encrypted messages are only encrypted at the communication endpoints, i.e. the host and device. Notwithstanding that the gateway 18 merely repackages encrypted messages and need not decrypt such messages, the gateway does not have access to host or device encryption keys and therefore is unable to decrypt any messages routed therethrough. If the host operates in a corporate network behind a corporate firewall (not shown) for example, update messages and thereby any data records therein that are encrypted at the host system behind the corporate firewall remain encrypted and thus secure until decrypted by a recipient device, effectively extending the firewall to the device. Messages encrypted at a device similarly remain secure until decrypted at a host system.

In order to reduce wireless network bandwidth requirements, update messages may also be compressed prior to encryption. A message recipient then decompresses a received message following decryption of the message.

Although not specified at all subsequent references to transmission of update messages and other data record related messages, it is to be understood that any or all of the above compression, encryption and repackaging operations may be performed before transmission of such messages. Similarly, the receipt of such messages may be followed by corresponding unpacking, decryption and decompression operations.

After the update message 56 has been compressed (if desired), encrypted and repackaged as described above, the device 12 transmits this update message 56 to the host system 22A to indicate that an update has occurred.

At time t=B, the host 22A receives, unpackages, decrypts and decompresses the update message 56 from the device 12. At step 54, the host synchronization software then compares the HSP value from the update message 56 to the HSP value stored at the host database 24A for the particular data record that was modified by the device. If the HSP values do not match, then a conflict has occurred and, depending on whether the host 22A or the device 12 is designated as the master (as opposed to a slave), the host may or may not accept the changes from the update message 56. This conflict resolution process is described in more detail below. Assuming for purposes of FIG. 3 that the HSP values match, the host 22A would then accept the changes from the update message 56, store the updated data record $DR_{DU}$ at the host database 24A, and increment the DSP value to DSP+1. The data record 30 is then synchronized at the device 12 and the host system 22A.

If the host 22A had made the update to the data record 30 at step 52 instead of the device 12, then the HSP value at the host would have been incremented to HSP+1 at the host database, the data record would have been overwritten with the new, updated data record $DR_{HU}$, and an update message would have been transmitted from the host 22A to the device 12. This update message would have included the DSP value from the host (DSP) the HSP value from the host (HSP+1), and the updated data record $DR_{HU}$. Assuming that no conflict is detected by the device software, the device then accepts the update message from the host in the same manner that the host 22A accepted the update message from the device 12.

Figure 4:
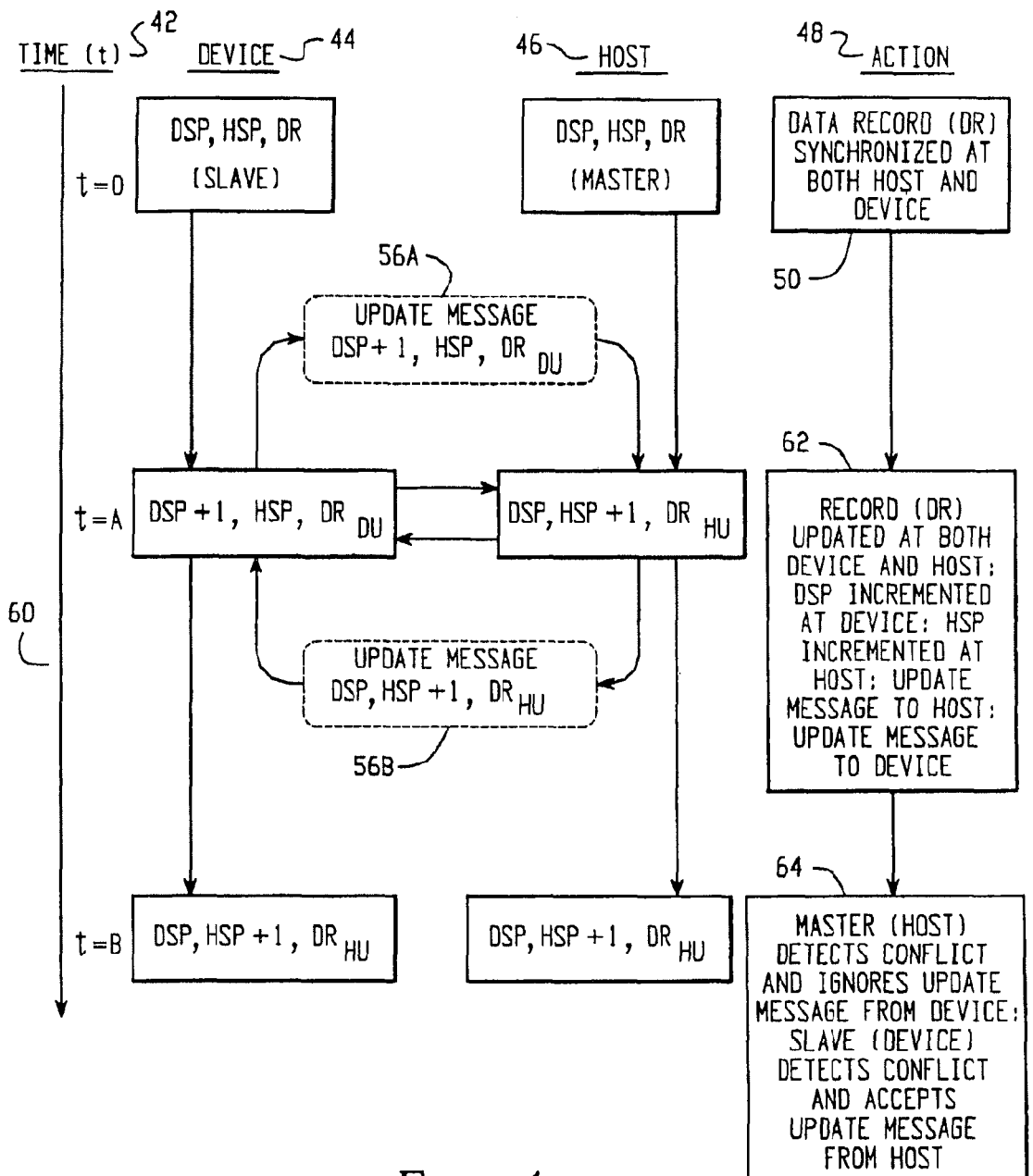
FIG. 4 is a timing flow diagram showing a method of data record synchronization and conflict resolution between a host system and a portable communication device, wherein the data record is simultaneously updated at both the host system and the portable communication device.

FIG. 4 is a timing flow diagram showing a method of data record synchronization and conflict resolution between a host system 22A and a portable data communication device 12, wherein a particular modified data record 30 is simultaneously updated at both the host system 22A and the portable data communication device 12. This is the conflict situation. It can occur when either the host 22A or device 12 makes a change to a particular data record 30 before the update message is received from the device 22A or the host 12, thereby resulting in a conflict because the synchronization parameters (DSP, HSP) are now out of synchronization. The present invention overcomes this problem by the use of a user-selectable master-slave architecture in which the user of the system designates either the device 12 or one of the hosts 22A, 22B, 22C as the master. If one of the hosts is selected as the master, then the device is a first level slave that performs conflict resolution based on an update message from the master host, and the other hosts (to the extent there are any) are second level slaves that perform conflict resolution based on an update message from the device 12. Thus, in a system with multiple hosts, there are two levels of slaves, the device being the first level that slaves off the master host, and the other hosts being the second level that slave off the device. If the device is the master however, then all of the hosts are first level slaves that perform conflict resolution based on an update message from the device, and there are no second level slaves.

Referring now in detail to FIG. 4, at time t=0, the data record 30 to be updated is synchronized at both the host system database 24A and the device database 14. Prior to this step, the user of the system has designated (through software operating at the host and the device for example) the host as the system master, and the device as the system slave. Thus, if there is a conflict between a particular data record being updated on the device 12 and the host 22A, the host will control.

At step 62, a particular data record 30 is updated at both the device (slave) 12 and the host (master) 22A. At the device 12, the DSP value is incremented to DSP+1, and the data record (DR) is updated to $DR_{DU}$. A first update message 56A including the new device synchronization parameter (DSP+1), the host synchronization parameter (HSP) stored at the device 12, and the updated data record $DR_{DU}$ from the device is transmitted to the host 22A. Simultaneously at the host, the HSP value is incremented to HSP+1, and the data record (DR) is updated to $DR_{HU}$. A second update message 56B including the new host synchronization parameter (HSP+1), the device synchronization parameter stored at the host (DSP), and the updated data record $DR_{HU}$ from the host is transmitted to the device 12.

At step 64, the device 12 receives the second update message 56B from the host 22A, and the host 22A receives the first update message 56A from the device 12, thus creating a conflict as to the particular data record that was simultaneously updated. The host 22A, which was previously designated as the master, examines the HSP value transmitted in the update message 56A from the device 12 and determines that there is a conflict since the HSP value stored at the host 22A is greater than the HSP value transmitted in the update message 56A from the device 12. Because the host 22A has been designated as the master, the host 22A will simply ignore the conflicting update message 56A from the device 12. Conversely, the device 12, which was previously designated as the slave, examines the DSP value transmitted in the update message 56B from the host 22A and determines that there is a conflict since the DSP value stored at the device 12 is greater than the DSP value transmitted in the update message 56B from the host 22A. Because the device 12 has been designated as the slave, the device 12 will then accept the updated data record from the host—$DR_{HU}$—and will decrement the stored DSP value at the device 12 so that it is the same value as the DSP value transmitted in the update message. Thus, the conflict has been resolved and the host 22A and the device 12 are synchronized based on the update message 56B from the host 22A.

Figure 5:
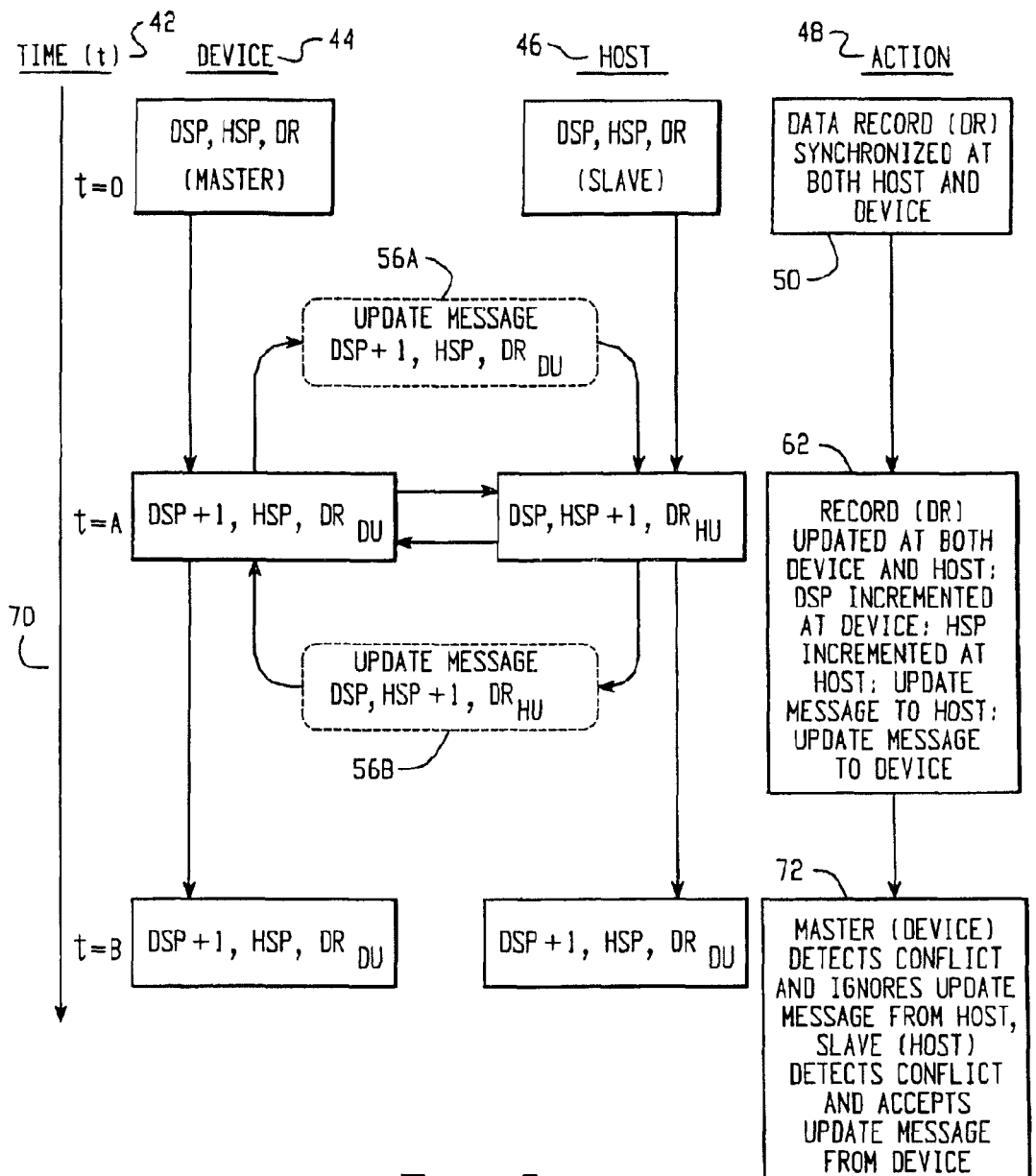
FIG. 5 is a timing flow diagram showing another method of data record synchronization and conflict resolution between a host system and a portable communication device, wherein the data record is simultaneously updated at both the host system and the portable communication device.

FIG. 5 is a timing flow diagram 70 showing another method of data record synchronization and conflict resolution between a host system 22A and a portable data communication device 12, wherein the data record is simultaneously updated at both the host system 22A and the portable data communication device 12. In this figure, the device 12 is designated as the master, and the host system 22A is the slave. The sequence of actions shown in FIG. 5 is identical to that shown in FIG. 4, except that because the device is the master, and thus controls in any conflict situation, at time t=B (step 72) the net result is that the update message from the device 56A is accepted by the host, and the updated device record from the device ($DR_{DU}$) is written to the host database 24A. In addition, the host 22A decrements the HSP value to be consistent with the HSP value contained in the update message 56A from the device master 12.

Figure 6:
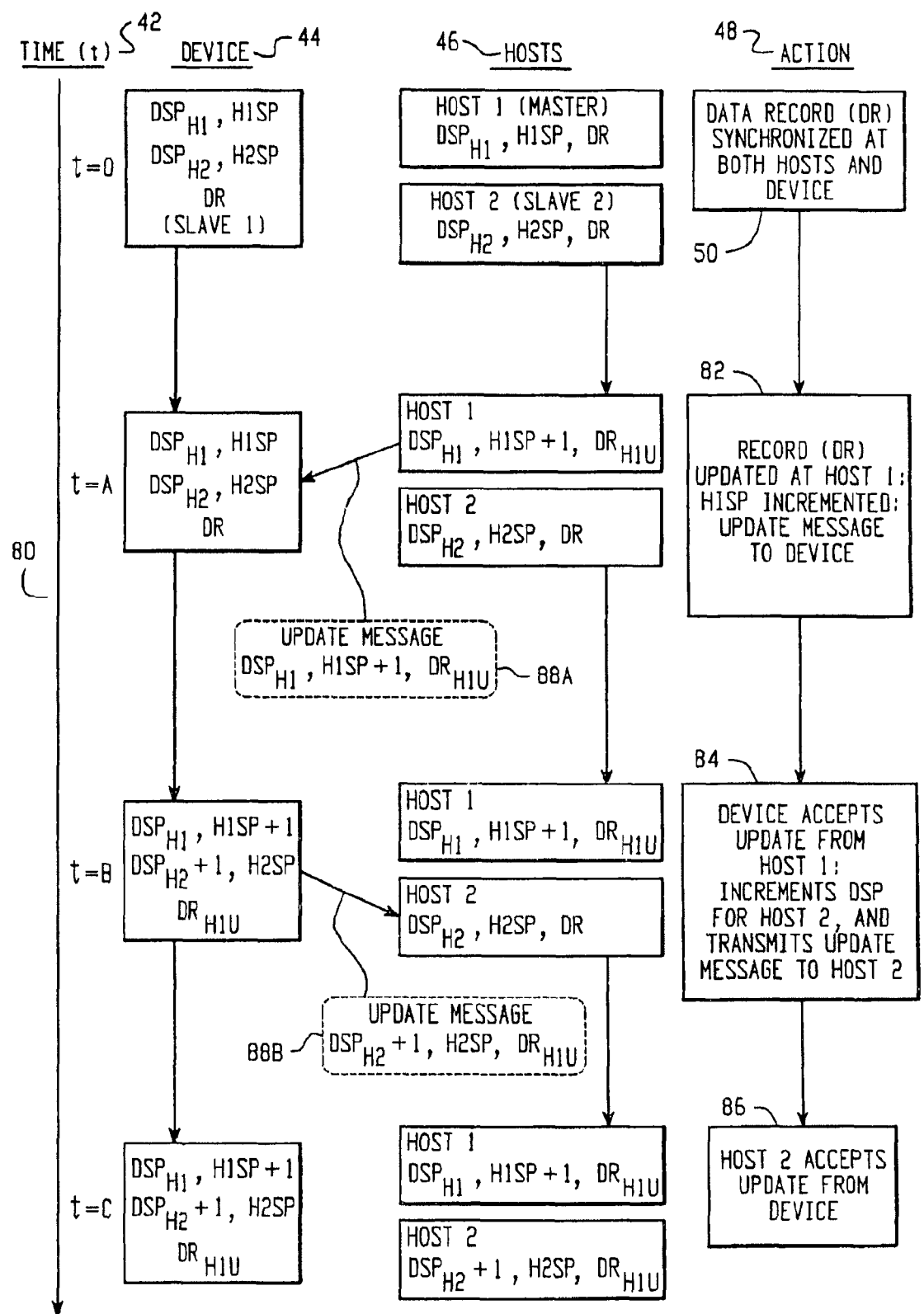
FIG. 6 is a timing flow diagram showing a method of data record synchronization between a plurality of host systems and a portable communication device, wherein the data record is updated at the master host system.

FIG. 6 is a timing flow diagram showing a method of data record synchronization between a plurality of host systems 22A, 22B, 22C and a portable data communication device 12, wherein the data record 30 is updated at the master host system. As noted above, in the embodiment of the invention where more than one host system is being synchronized to the device 12, it is useful to have a two-level master-slave architecture in which one of the hosts (host 1) is the master, the device 12 is the first level slave, and any remaining hosts (host 2) are second level slaves. Operations associated with such a configuration are shown in FIG. 6.

When the device 12 is being synchronized to more than one host system (host 1, host 2), the data structure shown in FIG. 2B is used to store modified data records 30 at the device 12. Thus, in the configuration shown in FIG. 6, the device 12 includes modified data records 30 that include the data fields (DR) from the unmodified data record, a device/host synchronization parameter pair for host 1 ($DSP_{H1}$/H1SP), and a device/host synchronization parameter pair for host 2 ($DSP_{H2}$/H2SP). However, as described briefly above, the hosts need only one pair of synchronization parameters. Thus, host 122A includes modified data records having the device/host synchronization parameter pair for host 1 ($DSP_{H1}$/H1SP), and host 222B includes modified data records having the device/host synchronization parameter pair for host 2 ($DSP_{H2}$/H2SP).

At time t=0 (step 50) the data record 30 to be updated is synchronized at the device 12 and both hosts (host 1, host 2) 22A, 22B. This data record 30 has been modified at the device 12 to include the device/host synchronization parameter pair for host 122A ($DSP_{H1}$/H1SP) and the device/host synchronization parameter pair for host 222B ($DSP_{H2}$/H2SP). The corresponding data record 30 at host 122A has been modified to include the device/host synchronization parameter pair for host 1 ($DSP_{H1}$/H1SP) and the corresponding data record 30 at host 222B has been modified to include the device/host synchronization parameter pair for host 2 ($DSP_{H2}$/H2SP).

At time t=A, the data record 30 at host 122A is updated to $DR_{H1U}$, and the host 122A synchronization parameter (H1SP) is incremented to H1SP+1. Similar to the process described above, an update message 88A is then transmitted from host 122A to the device 12. This update message 88A includes the device synchronization parameter for host 1 ($DSP_{H1}$), the new host 1 synchronization parameter (H1SP+1), and the updated data record ($DR_{H1U}$).

The device 12 receives the update message 88A at time t=B (step 84), and examines the DSP value to determine if there is a conflict. Since the DSP value from the host is the same as the DSP value stored at the device 12, no conflict is detected, and thus the device simply accepts the update message from host 1. In so doing, the data record 30 stored at the device database 14 is updated to be $DR_{H1U}$, and the host 1 synchronization parameter (H1SP) stored at the device 12 is incremented to H1SP+1. Because the data record 30 has been updated at the device 12, the device synchronization parameters ($DSP_{H2}$) for the other hosts (host 2) that did not initiate the update message 88A are incremented by 1, and another update message 88B is generated. This second update message 88B is transmitted from the device 12 to the other hosts (host 2), and includes the new device synchronization parameter ($DS_{PH2}$+1), the corresponding host synchronization parameter (H2SP), and the updated data record ($DR_{H1U}$) that was transmitted from the master host system (host 1) 22A.

At step 86, the other hosts (host 2) receive the second update message 88B and first determine whether a conflict exists by comparing the transmitted host synchronization parameter (H2SP) with that stored at the respective other host. Assuming no conflict exists, the other hosts (host 2) accept the changes from the update message, increment the corresponding device synchronization parameter $DSP_{H2}$, and store $DR_{H1U}$ as the updated data record. In this manner, an update at host 1 is synchronized to both the device 12 and any other hosts (host 2) that are being synchronized via the system.

Figure 7:
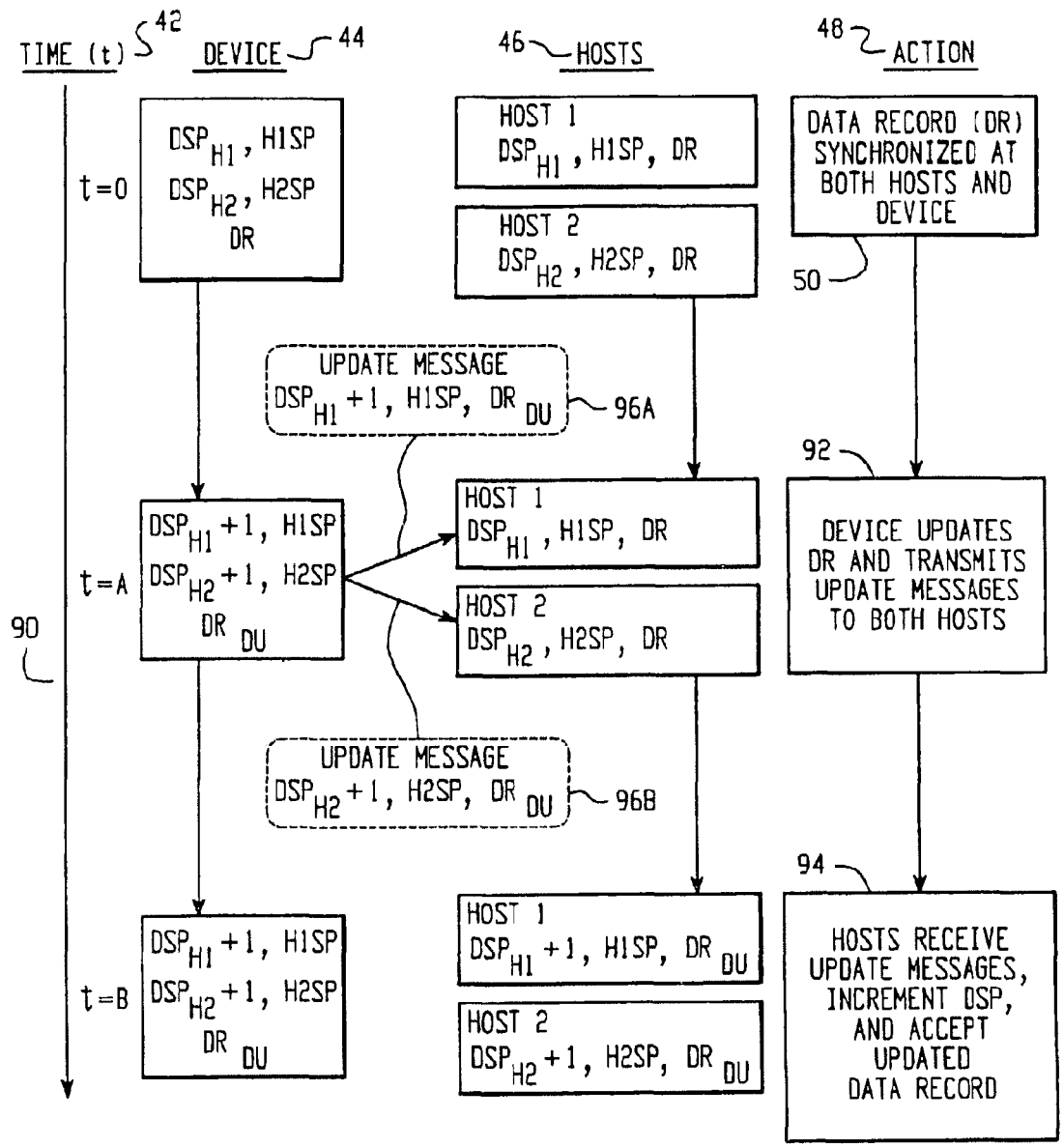
FIG. 7 is a timing flow diagram showing a method of data record synchronization between a plurality of host systems and a portable communication device, wherein the data record is updated at the portable communication device.

FIG. 7 is a timing flow diagram 90 showing a method of data record synchronization between a plurality of host systems 22A, 22B, 22C and a portable data communication device 12, wherein the data record 30 is updated at the portable data communication device 12. At step 50, the data record to be updated is synchronized at the hosts (host 1, host 2) 22A, 22B and the portable device 12. As described above, the device 12 includes data records 30 modified to include the device/host synchronization parameter pair (DSP/HSP) for each host that it is being synchronized with. The respective hosts include data records 30 modified to include the respective device/host synchronization parameter pair (either $DSP_{H1}$, H1SP or $DSP_{H2}$, H2SP).

At step 92, the device 12 updates the data record DR to $DR_{DU}$, and increments both device synchronization parameters $DSP_{H1}$, $DSP_{H2}$. Then, the device 12 generates two update messages 96A, 96B, one for the first host (host 1) 96A, and another for the second host (host 2) 96B. The update message 96A transmitted to host 1 includes the incremented DSP for host 1, the host 1 synchronization parameter (H1SP) stored at the device 12, and the updated data record $DR_{DU}$. Likewise, the update message 96B transmitted to host 2 includes the incremented DSP for host 2, the host 2 synchronization parameter (H2SP) stored at the device 12, and the updated data record $DR_{DU}$.

At step 94, the hosts receive the update messages 96A, 96B and examine the respective host synchronization parameters in the update message 96A, 96B to determine if any conflict exists. Assuming that there is no conflict, the hosts accept the update information by storing $DR_{DU}$ as the new data record and by incremented the respective device synchronization parameters $DSP_{H1}$, $DSP_{H2}$.

Figure 8:
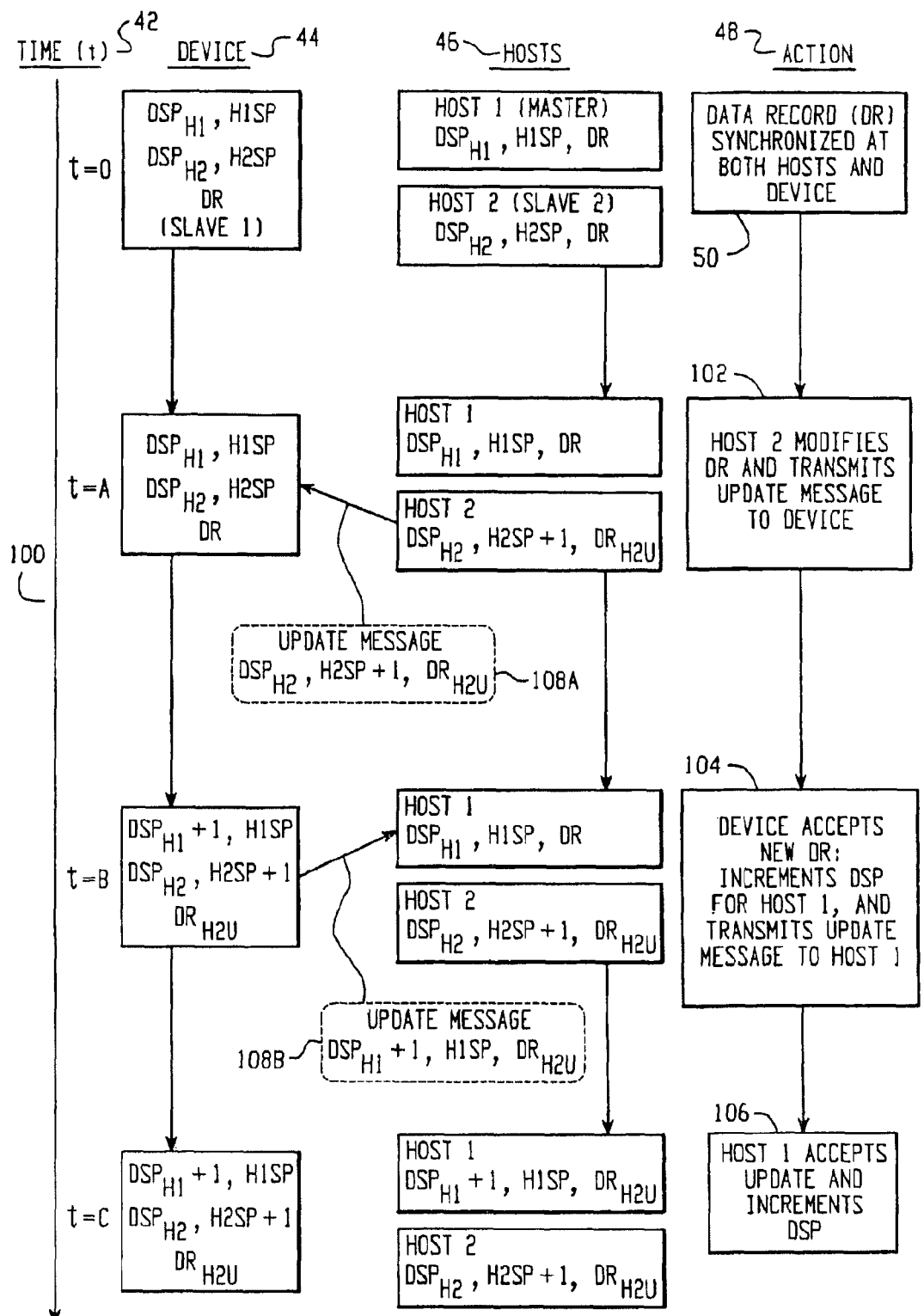
FIG. 8 is a timing flow diagram showing a method of data record synchronization between a plurality of host systems and a portable communication device, wherein the data record is updated at the slave host system.

FIG. 8 is a timing flow diagram 100 showing a method of data record synchronization between a plurality of host systems 22A, 22B, 22C and a portable data communication device 12, wherein the data record is updated at a second-level slave host system. Recall from the description above that the master-slave architecture of the present invention may configure one of the hosts as the master and the device as a first level slave that is controlled by update messages from the host master. The remaining hosts are then configured as second-level slaves that are controlled by update messages from the first-level slave device 12. This is the configuration shown in FIG. 8.

At step 50, the hosts 22A, 22B and the device are synchronized. At step 102, the second-level slave host (host 2) updates a particular data record DR to $DR_{H2U}$. The corresponding host synchronization parameter H2SP is incremented to H2SP+1, and an update message 108A is transmitted from the second-level slave (host 2) to the first level slave (device) 12, including the DSP for host 2, the updated HSP, and the update data record $DR_{H2U}$.

At step 104, the first-level slave device 12 receives the update message 108A and verifies that there is no conflict by comparing the transmitted DSP ($DSP_{H2}$) with the DSP stored at the device for this particular data record. Assuming there is no conflict (i.e., the DSPs are the same value), the device 12 accepts the new data record $DR_{H2U}$ and increments the host synchronization parameter at the device 12 to be the same as that stored at host 2. Having updated its data record 30, the device, as a first-level slave to the master (host 1), then updates the DSP for host 1 ($DSP_{H1}$) and transmits a second update message 108B to host 1 including the incremented device synchronization parameter ($DSP_{H1}$+1), the host synchronization parameter for host 1 (H1SP), and the updated data record from host 2 ($DR_{H2U}$). As shown in FIG. 3, the master host then verifies that no conflict exists by comparing the host-side HSP with the HSP transmitted in the update message 108B. Assuming there is no conflict, at step 106 the host accepts the new data record $DR_{H2U}$, and increments the device synchronization parameter $DSP_{H1}$ so that it is synchronized with the device.

Figure 9:
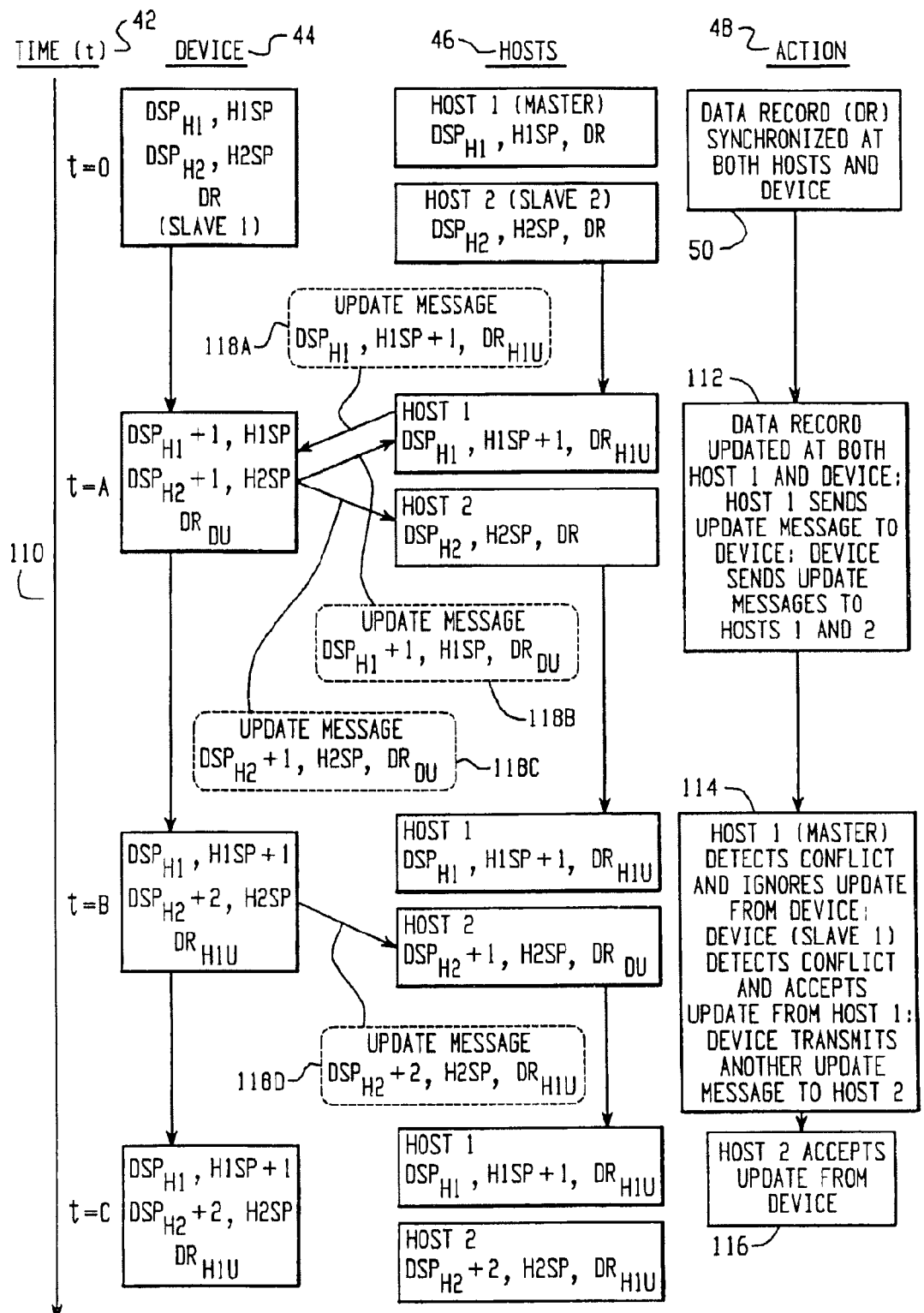
FIG. 9 is a timing flow diagram showing a method of data record synchronization and conflict resolution between a plurality of host systems and a portable communication device, wherein the data record is simultaneously updated by the master host system and the portable communication device.

FIG. 9 is a timing flow diagram 110 showing a method of data record synchronization and conflict resolution between a plurality of host systems 22A, 22B, 22C and a portable data communication device 12, wherein the data record is simultaneously updated by the master host system 22A and the portable data communication device 12. As with FIGS. 6, 7 and 8, at step 50 of FIG. 9 the data record to be updated is synchronized at the host systems (host 1, host 2) and the device 12. At step 112, the data record 30 is simultaneously updated at the master (host 1) and at the slave device 12. In so doing, the master (host 1) updates the data record to $DR_{H1U}$, increments the host 1 synchronization parameter (H1SP), and transmits an update message 118A to the device 12 that includes the updated data record ($DR_{H1U}$), the updated host 1 synchronization parameter (H1SP), and the device synchronization parameter for host 1 $DSP_{H1}$ that is stored at the host 1 database 24A. Likewise, the slave device 12 updates data record to $DR_{DU}$, increments the device synchronization parameters for host 1 ($DSP_{H1}$) and host 2 ($DSP_{H2}$), and transmits two update messages containing this information, one message 118B containing the host 1 synchronization information, and a second message 118C containing the host 2 synchronization information.

At step 114, host 1 receives the update message 118B from the slave device 12, and detects a conflict since the transmitted host 1 synchronization parameter (H1SP) in the message 188B is less than the H1SP stored at the host 1 database. Therefore, since the host is the master in this example, the update message 118B from the slave device 12 is ignored. At the same time, host 2 also receives the update message 118C from the slave device. Here, however, there is no conflict, and thus host 2 accepts the update message 118C, stores the new data record $DR_{DU}$, and increments the device synchronization parameter stored at host 2 ($DSP_{H2}$). Also at the same time, the device 12 receives the update message 118A from the master host 1. The device 12 detects the conflict by comparing the transmitted DSP to the DSP stored at the device 12, which was previously incremented. Detecting the conflict, the software operating at the slave device 12 accepts the updated data record $DR_{H1U}$ from the host, increments the host 1 synchronization parameter (H1SP), and decrements the DSP value for host 1 so that it is synchronized with the DSP value stored at the host 1 database. In addition, because the data record has been updated a second time at the device 12, the DSP for host 2 is incremented again to $DSP_{H2}$+2, and another update message 118D is transmitted to host 2 including the new data record $DR_{H1U}$, the updated DSP ($DSP_{H2}$), and the host 2 synchronization parameter (H2SP).

Finally, at step 116, host 2 receives the update message 118D and stores the updated data record $DR_{H1U}$ in its database. The device synchronization parameter at host 2 ($DSP_{H2}$) is then incremented so that it is in synchronization with the DSP for host 2 stored at the device 12.

The description above assumes that data records are synchronized between a device and any hosts, as indicated for example at step 50 in FIGS. 3-9, and that such synchronized data records are updated when changed at either the device or a host. According to a further embodiment of the invention, new data records added at a device are added to each host system with which the device records are to be synchronized, and new records added at a host system are added to a device and any further host systems.

Figure 10:
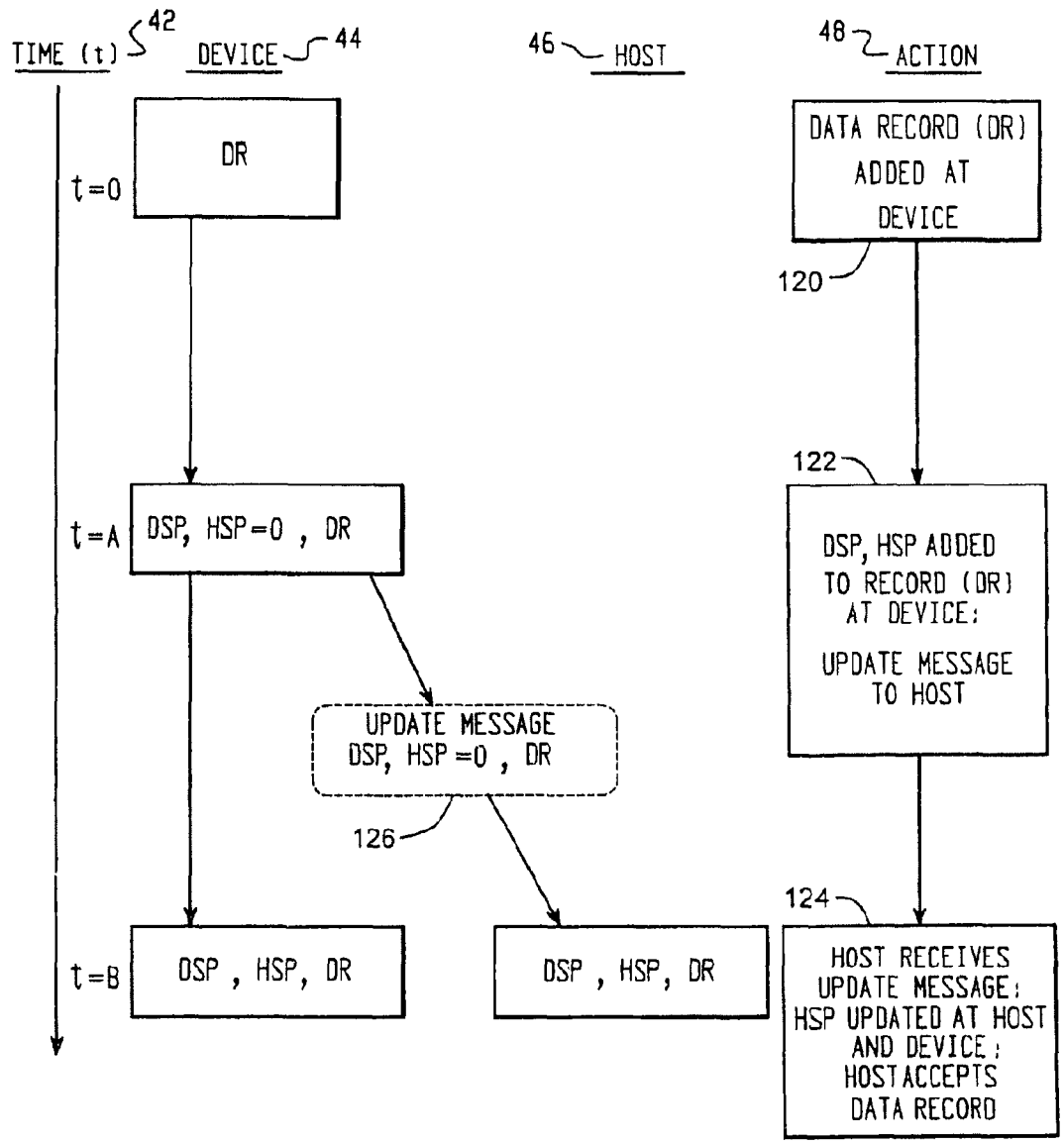
FIG. 10 is a timing flow diagram showing a method of replicating a new data record between a host system and a portable communication device according to an embedded add data record command scheme, wherein the new data record is added at the portable communication device.

FIG. 10 is a timing flow diagram similar to FIG. 3, but showing a method of synchronizing or effectively replicating a new data record between a single host system such as 22A and a portable data communication device 12. In FIG. 10, existing data records may have been synchronized between the device and host as described above, but since the aspect of the invention illustrated in FIG. 10 relates to new data records, no previous synchronization of such data records is possible and therefore has not been shown.

At time t=0, a user creates a new data record at the device 12 (step 120), by entering information into data fields 32 (FIG. 2A). At time t=A, a DSP and HSP are added to the new data record. Since the new data record does not yet exist in the host database, some mechanism must be provided to allow a host to determine that a data record must be added to its local database. As described above, the host examines the HSP in an update message to detect a synchronization conflict. It is therefore contemplated that a predetermined null or unused HSP value, such as 0, may be added to a new data record when created at a device. Therefore, at step 122, the device adds a DSP, which may have an initial DSP value assigned when existing data records are synchronized at the step 50 described above for example, and an HSP having the predetermined value, 0 in the example method of FIG. 10, to the new record. An update message 126 is also generated and possibly compressed, encrypted and repackaged, at the device and sent to the host system. After the update message 126 has been sent to the host, the device revises the HSP of the new data record stored in its database 14 to a new value, such as an initial HSP value assigned when existing data records are synchronized.

At time t=B, the host 22A receives the update message 126 from the device 12. At step 124, the host then detects the predetermined HSP value from the update message 126 and determines that the data record is a new data record to be added to the host system database 24A. Since the data record added at the device 12 is a new data record which does not yet exist in the host system database 24A, a conflict cannot exist when the predetermined HSP is detected by the host system in an update message 126. The host system 22A therefore need not check for a conflict. The host system 22A then updates the HSP to the new value used at the device, i.e. the initial value assigned when existing data records are synchronized for example, and updates the database 24A by adding the new data record. Since both the device 12 and the host system 22A must use the same predetermined value and new value for the HSP, it is preferred that these values are preselected values stored at both the device 12 and host system 22A.

If a new data record is added at the host 22A at step 120 instead of the device 12, then a predetermined null or unused DSP value would be assigned for the DSP in the new data record, and an update message would be transmitted from the host 22A to the device 12. This update message would include the predetermined DSP value from the host (DSP=0 for example), a predetermined HSP value from the host, such as the initial HSP value described above, and the new data record. The host system 22A then updates the DSP value in the new data record in its database 24A to a new value such as the initial DSP value assigned on synchronization of existing data records. When the predetermined DSP value is detected by the device, the device updates the DSP to the new value and adds the new record to the device database 14. The predetermined and new DSP values, like the predetermined and new HSP values described above, are preferably stored at both the device and the host system.

After a new data record has been replicated, or added to other databases with which the database in which the new data record is first created is to remain synchronized, subsequent updates to the new data record may be processed as described above to ensure that data record updates made at a host system or device are reflected at the other system, i.e. the device or host system, respectively.

Although no data record conflict is possible when a new data record is added, the device 12 and any host systems with which the device 12 is to be synchronized, such as host system 22A for example, must not assign the same data record identifier when adding different new data records. When new data records are simultaneously being added at both the device 12 and host system 22A for example, different data record identifiers must be assigned to the data records. It will be appreciated that the term "simultaneously" is intended to include not only absolutely simultaneous data record addition, but also data record additions that at least partially overlap in time, such as when a device user creates a new data record before a data record added at a host system has been replicated at the device, and vice versa.

In view of the possibility of such simultaneous data record additions, the devices and hosts must not independently choose data record identifiers from a common group of identifiers. This duplicate identifier problem may be overcome by providing a central authority or system to assign identifiers for new data records. The central authority may be the designated master described above, a particular host system or device, or a further system associated with the synchronization system. Such a central administration system may permit re-assignment of identifiers when data records are deleted and thus more efficient re-use of a limited number of identifiers. However, a major shortcoming of this scheme is that assigned identifiers must somehow be communicated to the device or system adding a new record. This additional information exchange uses communication resources and in the case of a data record addition at the device, represents a further load on the wireless communication network and consumes device power. The requirement for new data record identifier distribution might also preclude addition of a new data item at a device when the device is out of the coverage area of the network 16.

Alternatively, according to an aspect of the invention, ranges of available data record identifiers may be pre-allocated to each device or system associated with each synchronized database. For a single device 12 and associated host system 22A for example, a pre-allocation scheme may be sufficient. The device 12 might be allocated all data record identifiers below a chosen value, whereas the host system 22A is allocated the data record identifiers equal to and above the chosen value. If the overall system includes a further host system 22B, the identifier allocation is somewhat more complicated, but may still be manageable. In the event that another host system 22C is to be added for database synchronization after initial synchronization system setup however, the available data record identifiers must be re-allocated between all devices and host systems.

In a further embodiment of the invention, each device or system associated with a synchronized database incorporates a number generator, including a random number generator or an accumulator for example. As will be apparent to those skilled in the art, all devices and systems will also have a unique equipment identifier. Every device 12 may for example have a network access number or device identifier, and each host system 22 will have some type of system identification code. Where the device 12 is designed for operation within a General Packet Radio Service (GPRS) network, the identification code may be associated with a Subscriber Identity Module or SIM card. When a new data record is added, a number is retrieved from the number generator and combined with the unique device identifier to determine a new data record identifier. A combination algorithm used to generate the data record identifier is chosen or configured according to a desired data record identifier format and may for example involve concatenating the number and device identifier or performing a logic operation. Further combination operations will also be apparent and are considered to be within the scope of the invention.

The number generator is preferably configured to ensure that a number is generated only once, to thereby avoid the assignment of duplicate data record identifiers to different records. Each new data record identifier might instead be checked to determine whether or not the identifier has already been assigned in the local database. If so, then a new number is retrieved from the number generator and a new data record identifier is generated using the retrieved number and the unique device identifier. When it is determined that a data record identifier does not occur in the local database, the identifier is assigned to the new data record.

Figure 11:
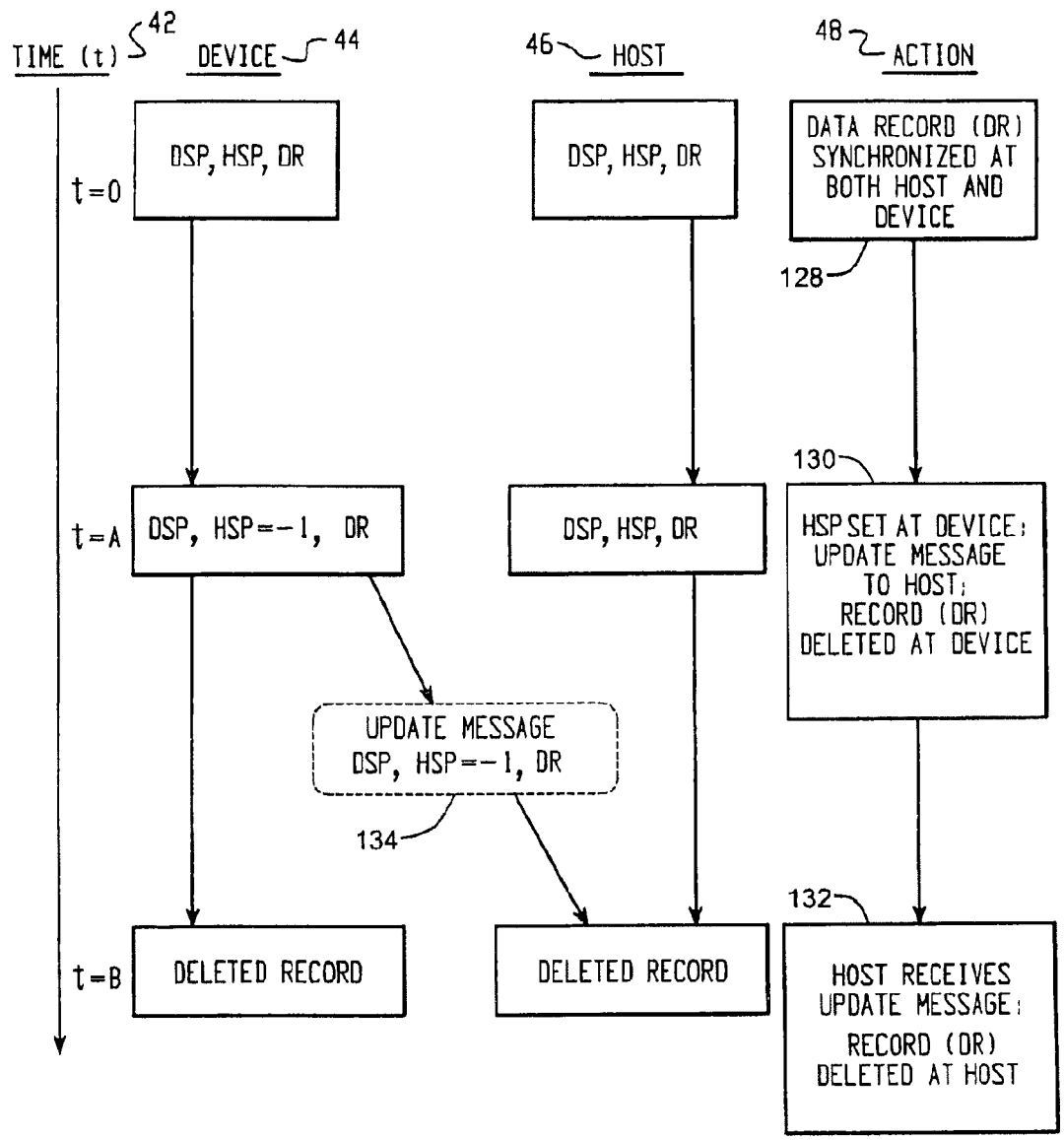
FIG. 11 is a timing flow diagram showing a method of deleting a data record from both a host system database and a portable communication device database according to an embedded delete data record command scheme, wherein the data record is deleted at the portable communication device.

Data record deletion could be accomplished using a second predetermined DSP or HSP, depending on where the data record deletion is initiated. FIG. 11 illustrates such a data record deletion function initiated by the device in a single-device, single-host system. In FIG. 11, the step 128 represents synchronization of a data record DR between a device 12 and a host such as host 22A. This synchronization may be a synchronization of complete databases 14 and 24A through a wired or wireless connection between the device 12 and the host 22A (step 50 in FIG. 3 for example), synchronization of single data records through a synchronized update process, or replication of a new data record.

When a user wishes to delete a data record in the device database, at a step 130 the HSP in the data record is set to a second predetermined null or unused value, −1 in the example shown in FIG. 11, which is preferably different than the first predetermined value used when a new data record is added at the device. Before the data record is actually deleted from the device database 14, an update message 134, including the DSP, the HSP having the second predetermined value and the data record, is prepared at the device and sent to the host. When the update message has been sent, the data record is then deleted at the device. Upon detection of the second predetermined HSP value in the received update message 134, the host 22A deletes the data record in the update message from its database 24A (step 132). Since the data record is being deleted, it is not essential that the DSP be sent in the update message 134. However, inclusion of the DSP in the update message 134 provides for a common update message format which is the same for adding, updating and deleting records. Since the data record is being deleted, it is contemplated that an identifier of the data record that may be used to locate the data record in the host system database 24A, may be included in the update message 134 instead of the entire data record. The update message 134 need only provide sufficient information to allow the host system 22A to locate the data record to be deleted.

Data record deletion initiated at a host system proceeds substantially as described above, except that the DSP is assigned the second predetermined value and an update message is sent from the host system to the device. For host system data record deletions, the HSP and complete data record need not necessarily be transmitted in the update message unless a common update message format is preferred.

Although it is possible that a conflict may occur during a data record deletion, where a data record is simultaneously deleted at both the device 12 and the host system 22A, such conflicts may simply be ignored. For example, if the host 22A cannot locate the data record in the update message 134 in its database 24A, which would occur when the data record has already been deleted at the host system 22A, then no further processing or operations are required. The update message 134 may simply be ignored. Similarly, if a host-deleted data record identified or included in an update message is not found in the device database 14, the device 12 may ignore the update message.

Figure 12:
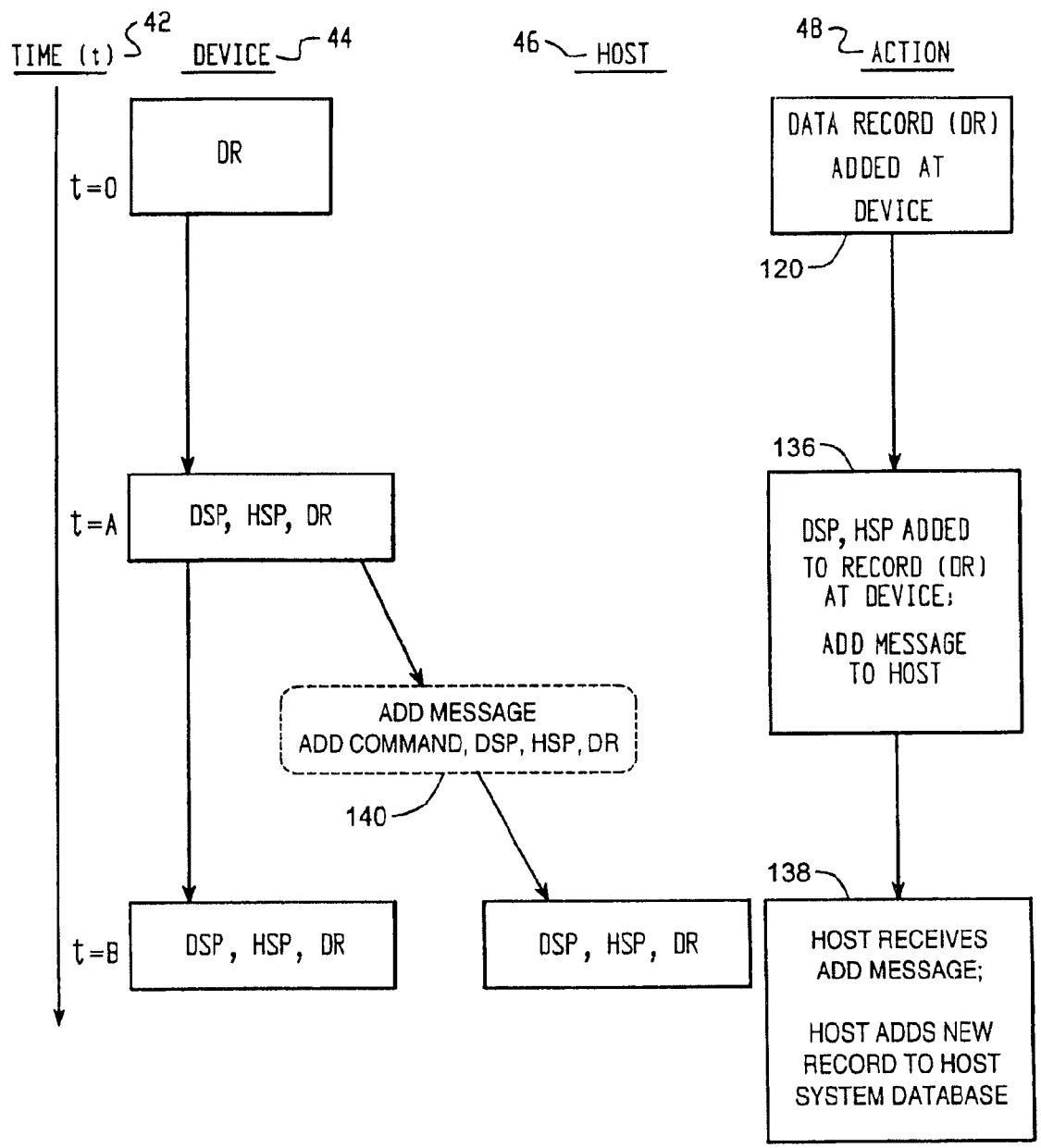
FIG. 12 is a timing flow diagram showing a method of replicating a new data record between a host system and a portable communication device according to an explicit add data record command scheme, wherein the new data record is added at the portable communication device.

According to the preceding embodiment of the invention, add and delete record functions initiated at the device 12 are effectively encoded into update messages 126, 134 using predetermined HSP values, 0 and −1 in the examples shown in FIGS. 10 and 11. A host system would initiate addition and deletion of data records at a device by including first and second predetermined values of the DSP in associated update messages. However, data record additions and deletions could instead be controlled by explicit function calls or commands. FIG. 12 represents a method in accordance with a further embodiment of the invention in which such explicit function calls are supported.

FIG. 12 is similar to FIG. 10 in that it shows the addition of a new data record at a device 12. As shown in FIG. 12, data fields for a new data record are entered at the device 12 at a step 120. At step 136, a DSP and HSP are added to the data fields to complete the data record in the device database 14. An add message 140 is also prepared and sent to any host system, 22A for example, with which the device database is to remain synchronized. The add message includes an explicit "add new record" command, the DSP, the HSP and the new data record (DR). When the host system 22A receives the add message at step 138, the new data record is accepted and added to the host database 24A. As described above, since the data record is a new data record that does not yet exist in the host database 22A, a check for a data record conflict is not necessary. Replication of data records added at the host system in the databases of the device and any other host systems would proceed in a similar manner.

Those skilled in the art will appreciate that embodiments of the invention using such explicit command messaging avoids the designation of first and second DSP and HSP values required for the embedded command scheme described above. The further HSP or DSP update required in the embedded command scheme, shown in step 124 of FIG. 10, is also thereby avoided.

Figures 13, 14:
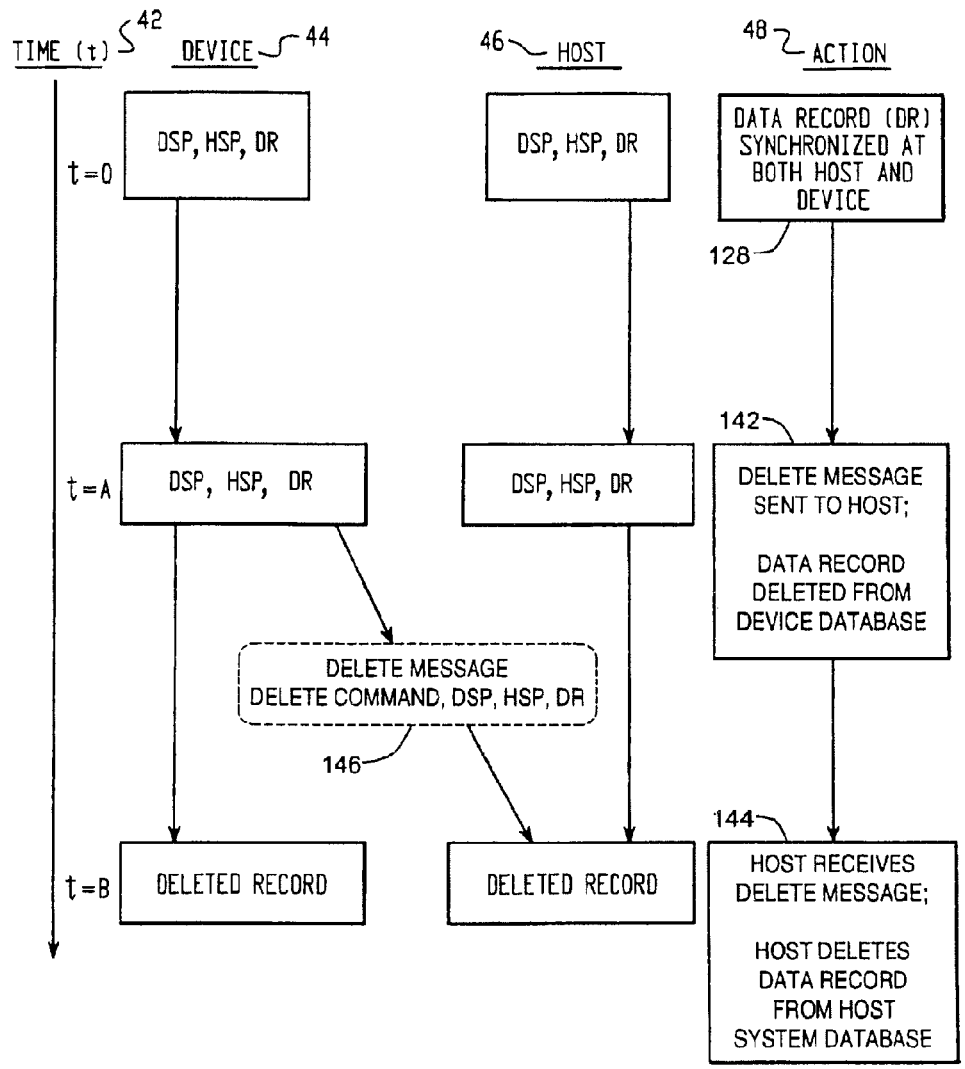
FIG. 13 is a timing flow diagram showing a method of deleting a data record from both a host system database and a portable communication device database according to an explicit delete data record command scheme, wherein the data record is deleted at the portable communication device.
FIG. 14 illustrates a possible format of an explicit command message that may be used in an explicit data record operation command scheme.

FIG. 13 represents a data record deletion process using explicit command messaging. Step 128 represents synchronization of a data record DR between a device 12 and a host such as host 22A. As described above in reference to FIG. 11, this synchronization may be a synchronization of complete databases, synchronization of single data records through a synchronized update process, or replication of a new data record.

When a user wishes to delete a data record in the device database, a delete message 146 is preferably automatically prepared by the device and sent to any host systems with which the device database is to remain synchronized. For example, when a user enters, selects from a menu or otherwise invokes a "delete data record" function, the delete message 146 is prepared at the device and sent to the host before the data record is actually deleted from the device database 14. The data record may be marked as deleted, but is preferably not deleted until the delete message 146 has been sent. When the update message has been sent, the data record is then deleted at the device. Upon receipt of the delete message 146, any associated host systems, such as 22A for example, will delete the data record from its database 24A (step 144). As described above, since the data record is being deleted, it is not essential that the DSP, HSP and entire data record be sent to the host systems. The delete message 146 must provide only such information, a data record identifier for example, as may be required to allow any host systems to locate and delete the data record. The operations involved in a host system-initiated data record delete process are similar to those shown in FIG. 13 and therefore should be apparent from the foregoing description.

The add and delete messages 140 and 146 preferably have the general format of the explicit command message 150 shown in FIG. 14. A command portion 148 includes one of a number of predetermined bit patterns, each predetermined pattern corresponding to a data record command supported within a data record synchronization system. For example, an add command and a delete command will each have an associated bit pattern which indicates the type of command to a device or host system receiving a command message. Although not described in detail above, those skilled in the art will appreciate that an update message may also be formatted as shown in FIG. 14. Any other data record commands could similarly be supported by assigning a unique bit pattern thereto. The length of the command portion 148 will be determined by a synchronization system operator or synchronization software developer, in accordance with such design criteria as a maximum desired command length, a minimum command length to provide for sufficient spare or unused patterns to support future command types, and compatibility with existing processing systems and software (an integral number of 8-bit bytes or 4-bit nibbles may be preferred over other bit lengths for example).

Each explicit command message preferably has a corresponding argument portion appended to the command portion 148. For an update command, the command message must include the DSP 34 and HSP 36 to provide for update conflict determination and resolution as described above, as well as the data fields 32. The complete updated data record is preferably included in an update command message, such that a recipient of the message replaces an existing data record with the updated data record and thus need not determine which particular data fields have been updated. An add new record command message must also include the DSP 34, the HSP 36 and all of the data fields 32. As described above however, the DSP and HSP need not be included in a delete command message, since no conflict determination is made before a data record is deleted. A delete command message may also include only a data record identifier field instead of all of the fields 32 of the data record.

When the device 12 is to be synchronized with more than one host system, adding and deleting data records is accomplished substantially as shown in FIGS. 10-13, although in such systems the addition and deletion processes must be performed, either simultaneously or consecutively, for each synchronized system. One possible method for adding a data record is shown in FIG. 15, in which a data record is added at a host system which has been designated as the master.

At a step 121, a new data record (DR) is added at host system 1. Host 1 synchronization parameters are then added, at step 123, to complete the data record in the host 1 database. An add message including the data record and host 1 synchronization parameter, is then prepared and sent to the device 12 (slave 1). The example flow diagram in FIG. 15 shows an explicit command scheme but is intended for illustrative purposes only. An embedded command scheme using predetermined synchronization parameters as described above could instead be used. It is also contemplated that a hybrid command scheme may also be implemented, particularly if it is desired to simultaneously support both synchronization command schemes. In the example system to which the method represented in FIG. 15 applies, if the device 12 supports both synchronization command schemes, then host 1 may support only an embedded command scheme, whereas host 2 may support an explicit command scheme. In most implementations however, all synchronized systems preferably support the same synchronization command.

The device 12 receives the add message 129A from host system 1 at time t=B, step 125. Since no conflict exists for a new data record, as discussed in detail above, the device accepts the new data record, adds synchronization parameters for any other synchronized host systems (host 2), stores the new record and synchronization parameters in its database 14, and sends a further add message 129B to any level 2 slaves, host 2 in FIG. 15. Upon receiving the add message 129B from the device 12, host system 2 accepts the new data record and adds the record and synchronization parameters to its database 24B. The new data record may then be updated at all synchronized databases when changed at the device or any of the host systems as described above.

Figure 15:
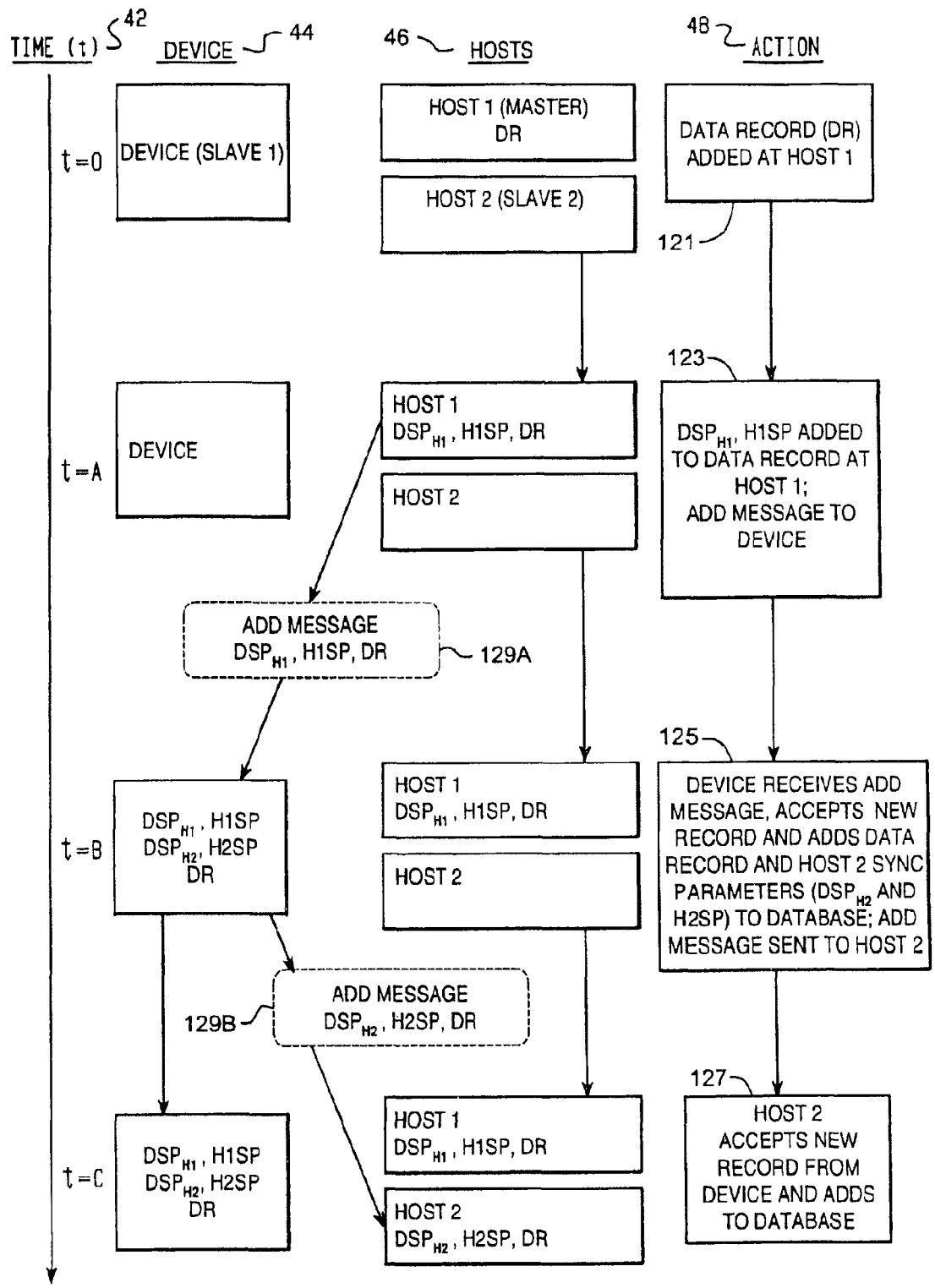
FIG. 15 is a timing flow diagram showing a method of replicating a new data record between a plurality of host systems and a portable communication device, wherein the data record is added at the master host system.

A data record deletion at the master system (host 1) also proceeds as shown in FIG. 15 except that delete messages would be transmitted instead of add messages, and a synchronized data record would be deleted. This will be apparent to those skilled in the art and is therefore not described in further detail.

Figure 16:
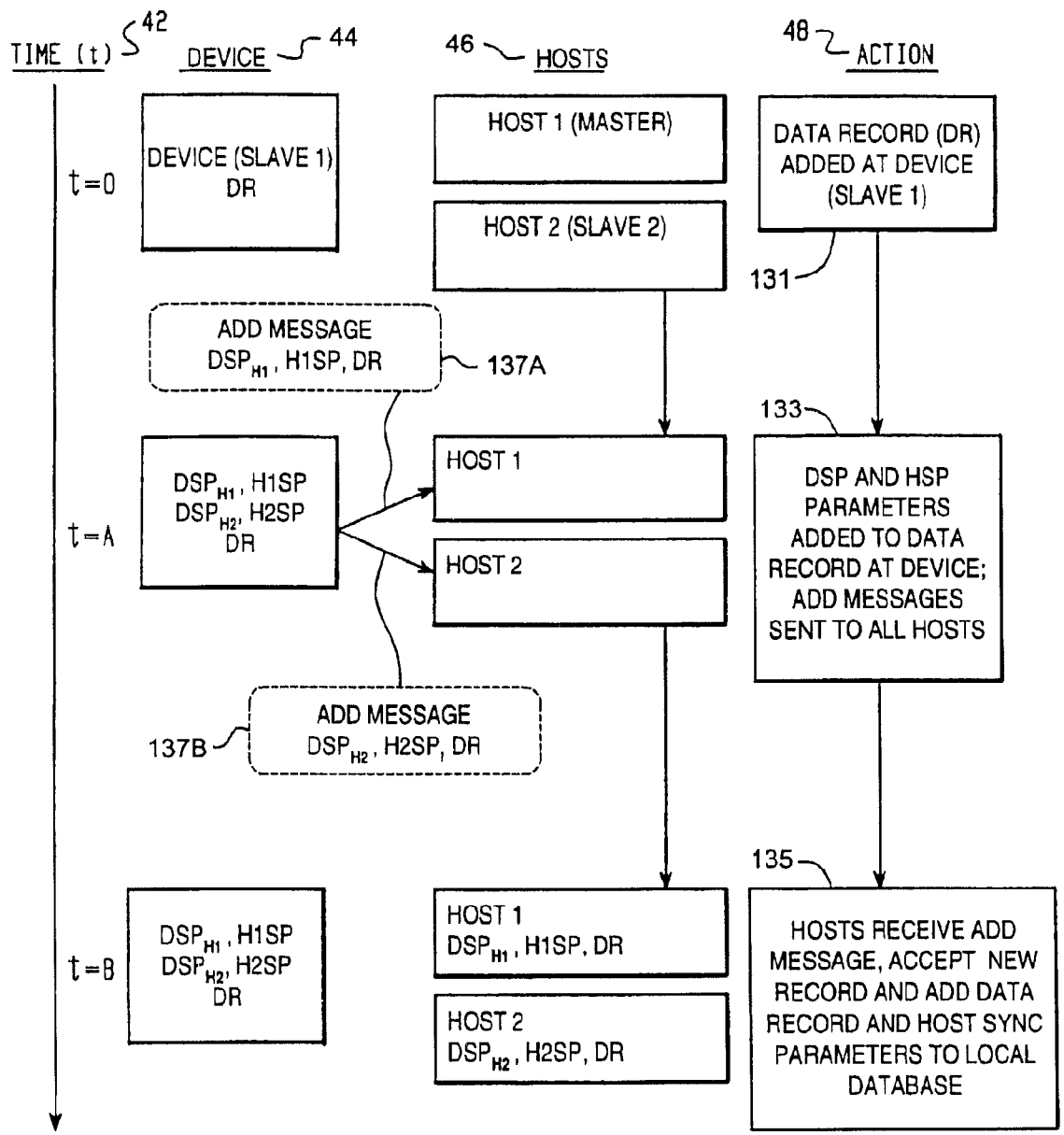
FIG. 16 is a timing flow diagram showing a method of replicating a new data record between a plurality of host systems and a portable communication device, wherein the data record is added at the portable communication device.

FIG. 16 represents a method of adding a new data record in a multiple-host system wherein a new data record is added at a level 1 slave, device 1 (step 131). When all synchronization parameters for all hosts have been added to complete the data record at the device 1 (step 133), add messages are prepared and sent to each synchronized host system. Each add message 137A, 137B includes the data record and only the synchronization parameters for the particular host, as shown. Upon receiving an add message, each host accepts the new data record and adds the data record and corresponding synchronization parameters to its database, at step 135. Deletion of a record proceeds similarly, with delete messages instead of add messages being sent to all host systems.

Figure 17:
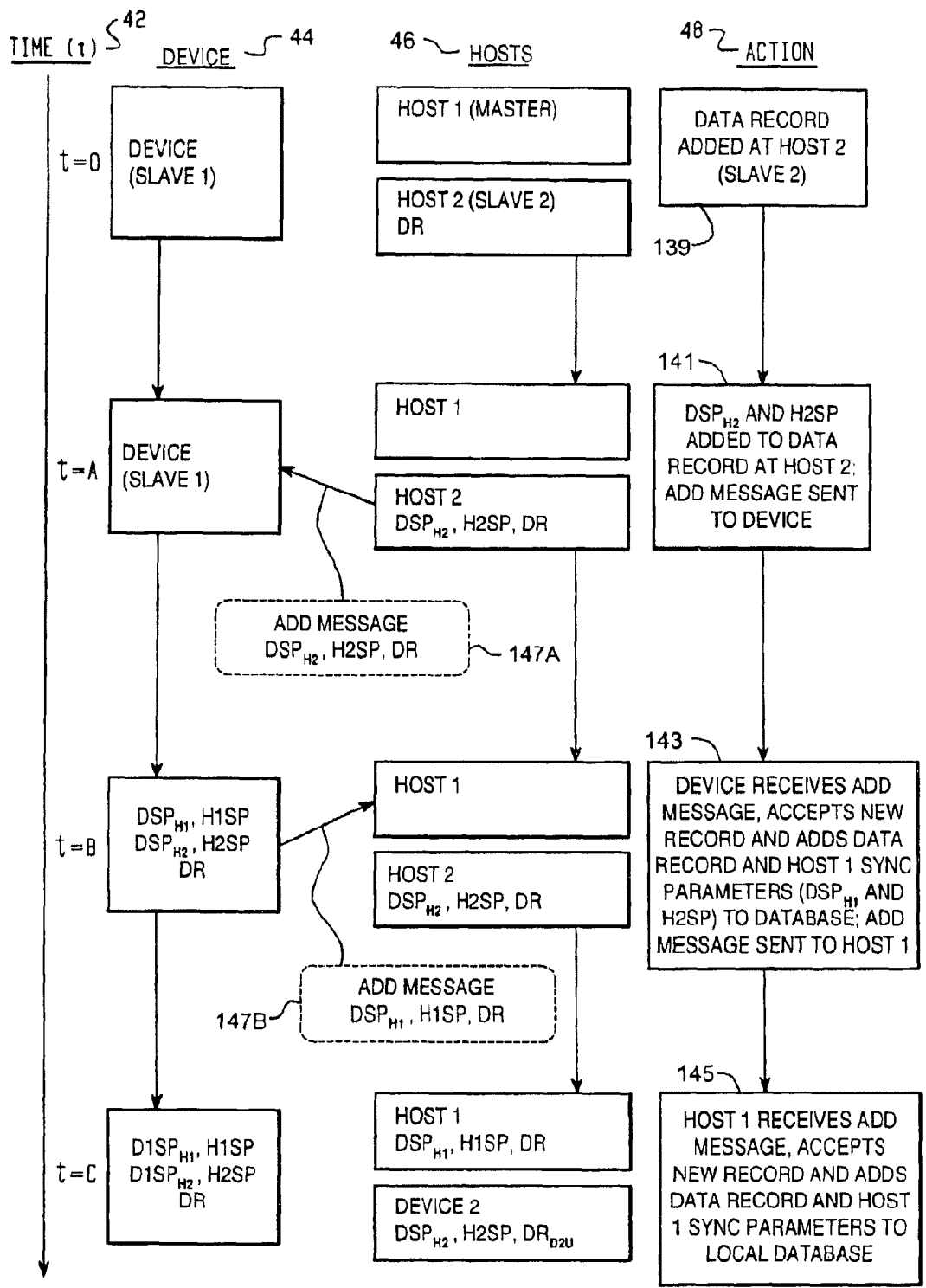
FIG. 17 is a timing flow diagram showing a method of replicating a new data record between a plurality of host systems and a portable communication device, wherein the data record is added at the slave host system.

In FIG. 17, a method for adding a new record at a second level slave is illustrated. After a new data record is added at host 2 (slave 2) at step 139, host 2 synchronization parameters $DSP_{H2}$ and H2SP are added to complete the data record in the host 2 database (step 141). An add message 147A is then prepared and sent to the first level slave, device 1. When the add message 147A is received, the device then accepts the new data record, adds the data record and synchronization parameters for host 2 and any other synchronized host systems such as host 1 to its database and prepares a second add message 147B for each other host system. In FIG. 15, only one other host system, host 1, is shown, although further host systems may also be implemented. An add message 147 would then be prepared for each host, including the data record and only the synchronization parameters associated with the host. For host 1, the add message therefore includes the data record and synchronization parameters $DSP_{H1}$ and H1SP. The host 1 receives the add message 147B at time t=C, accepts the new data record and adds the data record and synchronization parameters to its database. As in the previous examples of FIGS. 15 and 16, the process of deletion of a data record at a second level slave will be apparent from the description of new record addition in conjunction with FIG. 17.

Master and slave designations are primarily intended to facilitate resolution of conflicting data record updates, as described above. However, FIGS. 15-17 illustrate a further function of a master-slave arrangement. These designations may also effectively define a protocol or hierarchy for distribution of add and delete commands among synchronized systems. For example, in FIG. 17, the second level slave host 2 transmits an add message only to a first level slave device 1, which is then responsible for transmitting an add message to all further second level slaves and the master system host 1. Similarly, the master host 1 transmits an add message only to first level slave device 1, which then sends further add messages to all second level slaves such as host 2 (see FIG. 15). Thus the add and delete messages may be processed in the same way as update messages, except of course that no conflicts arise for new record additions or record deletions and resolution processing will not be performed.

Figure 18:
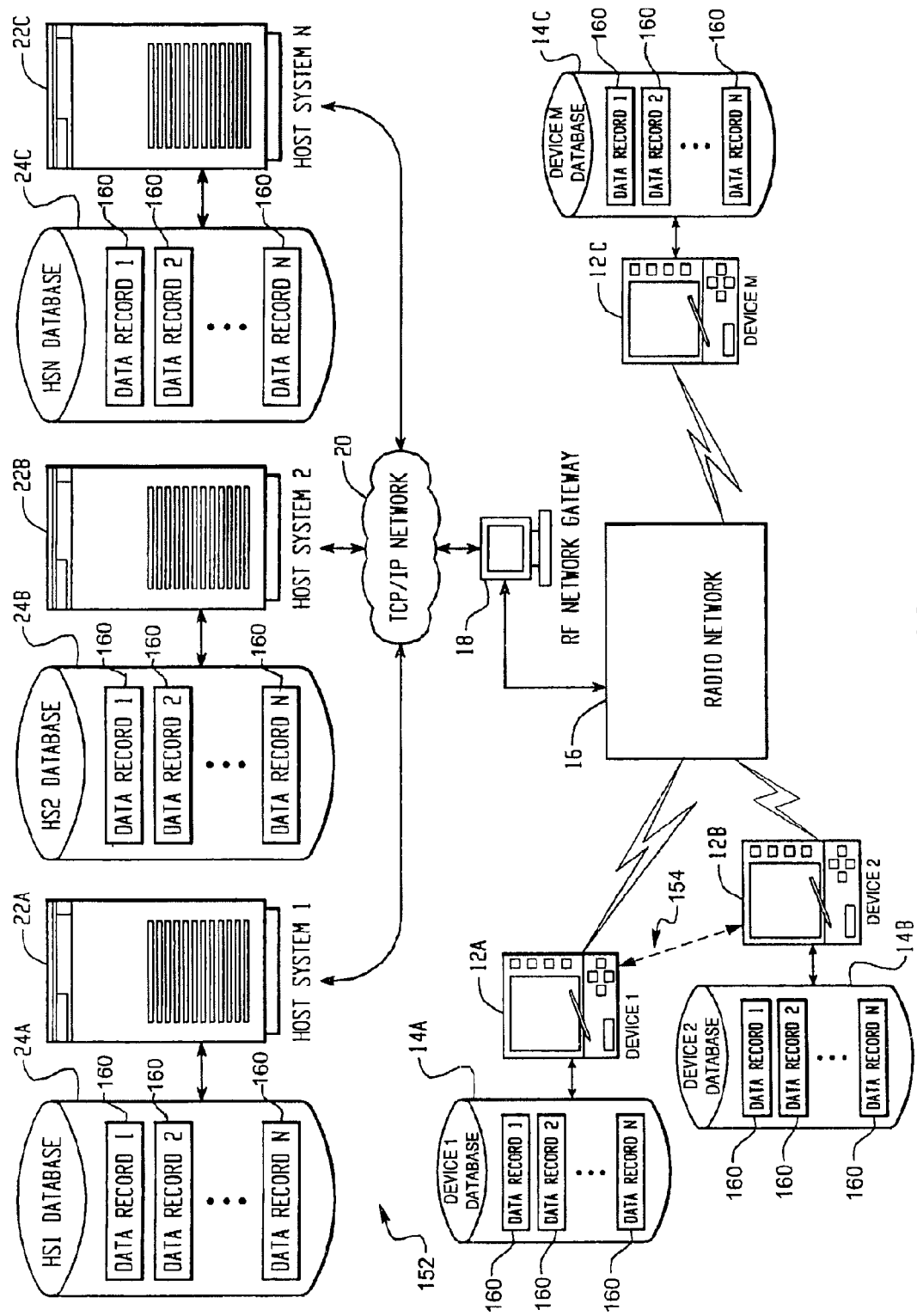
FIG. 18 is a diagram of a preferred system for synchronizing data records between a plurality of host systems and a plurality of portable communication devices via a wireless network, according to a further embodiment of the invention.

In the foregoing description, various aspects and embodiments of the invention have been discussed in relation to a system including a single device 12 and one or more host systems 22. However, the invention is in no way limited to systems including a single device. As shown in FIG. 18, a synchronization system 152 may comprise N hosts 22 and M devices 12. Within the example system shown in FIG. 18, all of the databases include data records 1 through N. The additional devices 12B and 12C in the system 152 behave effectively as further host systems relative to the device 12A.

Figures 19A, 19B:
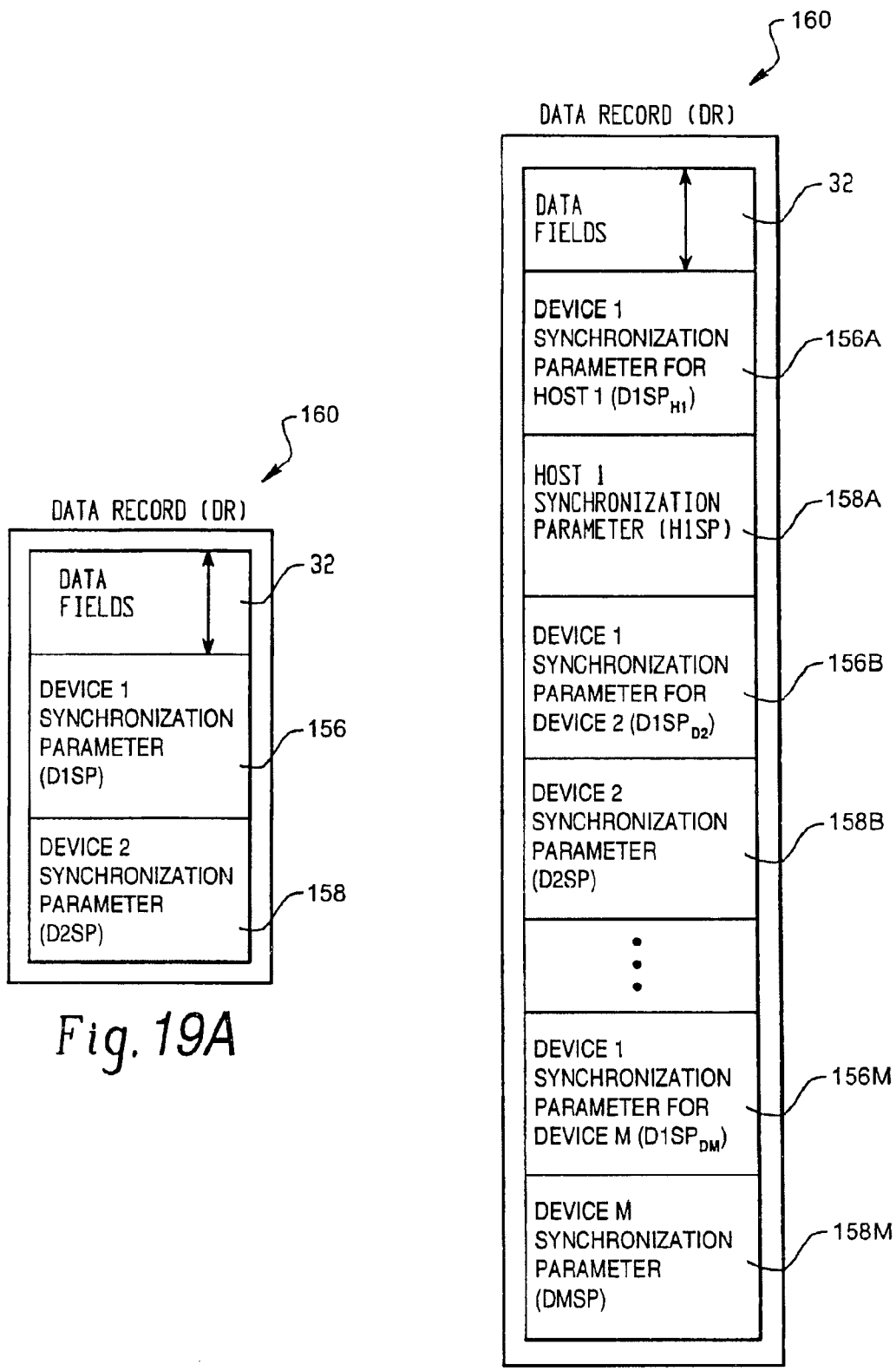
FIG. 19A is a schematic of a data record modified to operate in accordance with an embodiment of the present invention in which data records are synchronized between two portable communication devices.
FIG. 19B is a schematic of a data record modified to operate in accordance with another embodiment of the present invention in which data records are synchronized between a plurality of host systems and a plurality of portable communication devices.

In a multiple-device system such as 152, the format of stored data records 160 may be slightly different than shown in FIGS. 2A and 2B. When a device is to be synchronized with a single host system or multiple host systems, device data records will have the formats of FIGS. 2A and 2B, respectively. As described above, each host will store only the synchronization parameters associated with the particular host. FIGS. 19A and 19B show alternative data record formats for multiple-device synchronization.

Figure 20:
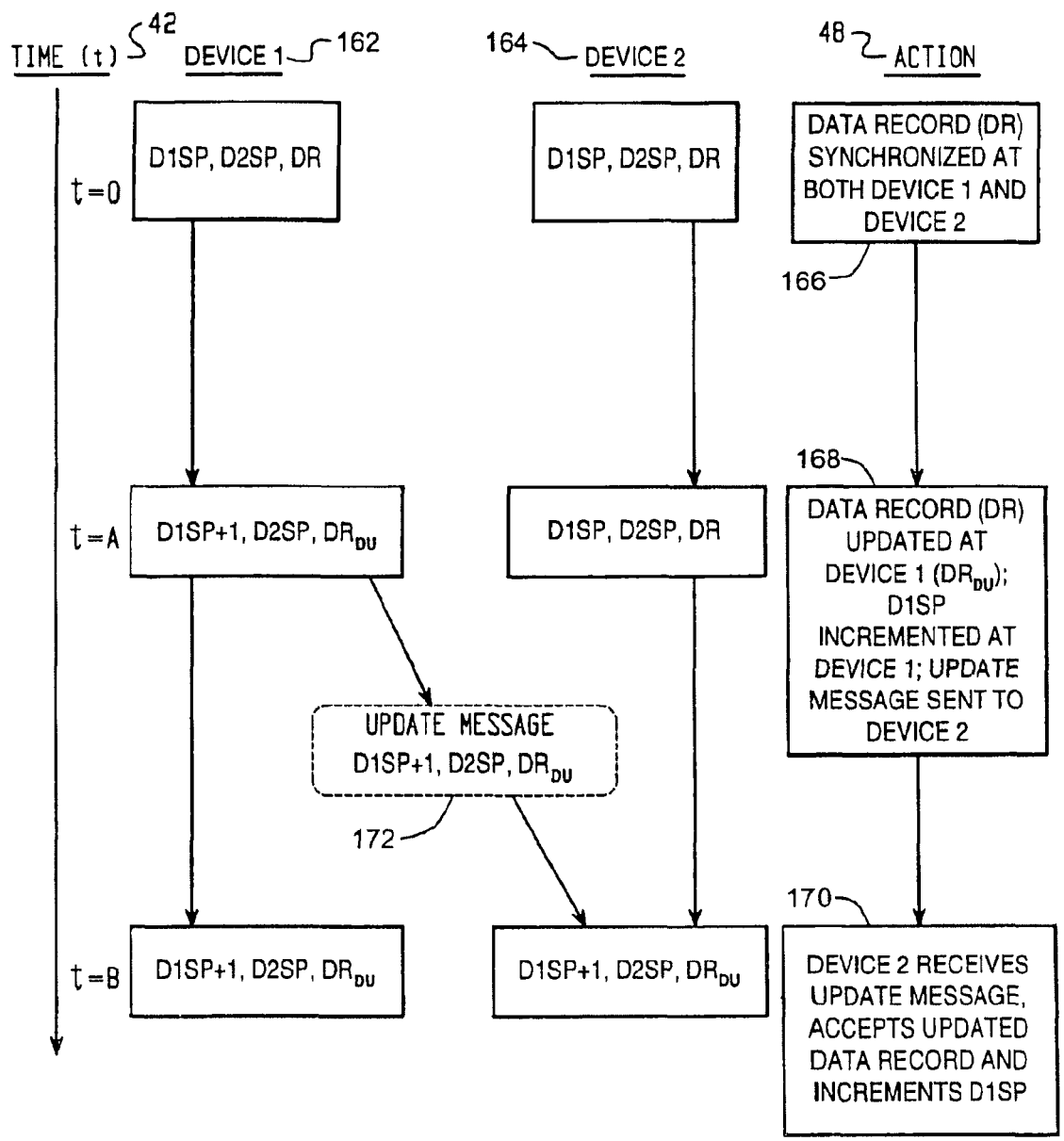
FIG. 20 is a timing flow diagram showing a method of data record synchronization between two portable communication devices.

The data record 160 shown in FIG. 19A represents a record for synchronization between two devices, device 1 and device 2. Instead of a DSP 34 and an HSP 36 as in FIG. 2A, where a data record is to be synchronized between two devices, the data record includes two DSPs 156 and 158, one for device 1 (D1SP) and another for device 2 (D2SP). Synchronization operations between devices are similar to those between a device and a host, and therefore are described only briefly below with reference to FIGS. 20-22. FIG. 20 is a timing flow diagram showing a method of data record synchronization between two portable communication devices 12A and 12B for example, wherein a data record is updated at device 1, 12A. As in the timing flow diagrams described above, FIG. 20 includes three columns. The first column 44 shows the data record 160 at the device 1 database 14A and the second column 164 shows the corresponding data record 160 at the device 2 database 14B. The third column 48 describes the actions performed, by software for example, at device 1 and device 2.

In FIG. 20, step 166 represents the synchronization of a data record between device 1 and device 2. The data record may have been previously synchronized between the devices through either a wireless transmission through the radio network 16, or possibly through a short-range communication link 154, such as an infrared or other light-based link, a Bluetooth™ communication link, or a direct wired communication link between the devices. As described in detail above, communication of update and other database or data record related messages between the devices is preferably secure.

At time t=0, device 1 and device 2 both store the same device synchronization parameters D1SP and D2SP, and data record fields (DR). At time t=A, the data record is updated at the device 1. A new, updated version of the data record is created by modifying or adding to the data fields 32 in some manner, thereby creating an updated data record—$DR_{DU}$. D1SP is then incremented at the device so that it is has a value D1SP+1. Whenever a data record is updated at the device 1 (or at device 2), an update message is generated. As shown at time t=A in FIG. 20, when the record is updated at the device 1 to $DR_{DU}$, the device, or software operating at the device for example, then generates an update message 172, including the updated D1SP parameter (D1SP+1), the D2SP parameter, and the updated data record ($DR_{DU}$), and transmits the update message 172 to device 2 to indicate that an update has occurred.

At time t=B, the device 2 receives the update message 172 from the device 1. At step 170, device 2 then compares the D1SP value from the update message 172 to the D1SP value stored at the device 2 database 14B for the particular data record that was modified at device 1. If the D1SP values do not match, then a conflict has occurred and may be resolved as described in further detail below. When the D1SP values match, device 2 would then accept the changes from the update message 172, store the updated data record $DR_{DU}$ at the device 2 database 14B, and increment the D1SP value to D1SP+1. The data record is thereby synchronized at device 1 and device 2. Synchronization of a data record which is updated at device 2 is accomplished substantially as described above, except that the D2SP parameter would be incremented and an update message 172 would be sent from device 2 to device 1.

Figure 21:
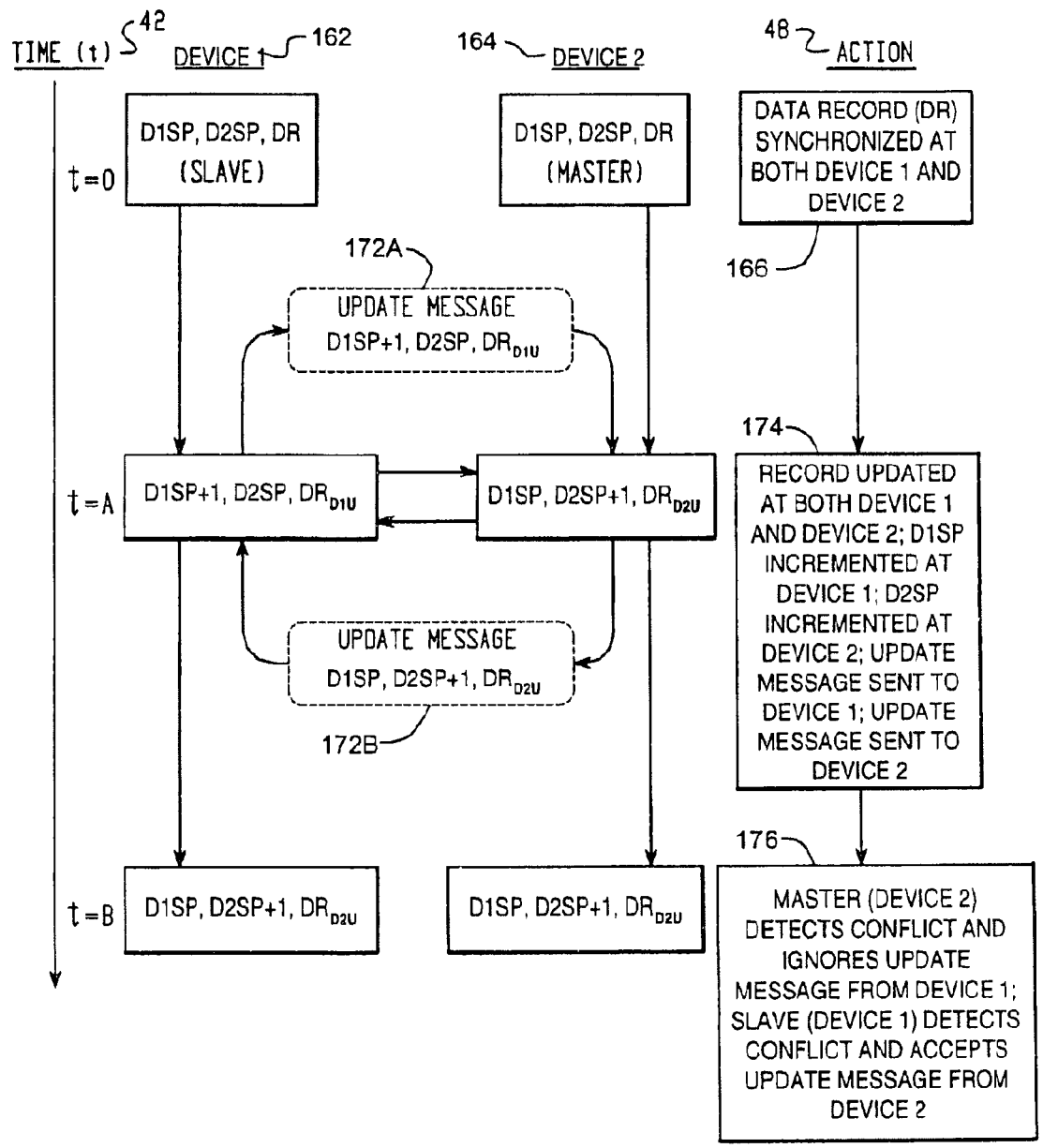
FIG. 21 is a timing flow diagram showing a method of data record synchronization and conflict resolution between two portable communication devices, wherein the data record is simultaneously updated at both portable communication devices.

FIG. 21 shows a method of data record synchronization and conflict resolution between two devices 1 and 2, wherein a particular data record is simultaneously updated at both devices. A conflict can occur when either device 1 or device 2 makes a change to a particular data record before an update message is received from device 2 or device 1, thereby resulting in a conflict because the synchronization parameters (D1SP, D2SP) are now out of synchronization. The user-selectable master-slave architecture described in detail above allows a user of the system to designate either the device 1 or the device 2, or any of the further devices or host systems, as the master. If one of the host systems or another device is selected as the master, then the device 1 is a first level slave that performs conflict resolution based on an update message from the master host system or device, and the other host systems and devices (to the extent there are any) are second level slaves that perform conflict resolution based on an update message from the device 1. Therefore, in a system with multiple hosts and/or devices, there may be more than one slave level, as described above. If a host system is designated as a master, then a device will preferably be a first level slave that slaves off the master host system, and any other hosts and devices may be second level slaves that slave off the device. If a device is the master, then all hosts and other devices are preferably first level slaves that perform conflict resolution based on an update message from the master device, such that there are no second level slaves.

Referring now in detail to FIG. 21, at time t=0, a data record is synchronized at between device 1 and device 2. For the purposes of this illustrative example, it is assumed that, prior to this step 166, a user of the system has designated (through device software operating at both devices for example) device 2 as the system master, and device 1 as the system slave. Thus, if there is a conflict between a particular data record being updated on the devices, device 2 will control.

At step 174, a particular data record is updated at both devices. At the device 1, D1SP is incremented to D1SP+1, and the data record (DR) is updated to $DR_{D1U}$. A first update message 172A including the new device 1 synchronization parameter (D1SP+1), the device 2 synchronization parameter (D2SP) stored at the device 1, and the updated data record $DR_{D1U}$ from device 1 is transmitted to device 2. Simultaneously at device 2, the D2SP value is incremented to D2SP+1, and the data record (DR) is updated to $DR_{D2U}$. A second update message 172B including the new device 2 synchronization parameter (D2SP+1), the device 1 synchronization parameter stored at the device 2 (D1SP), and the updated data record $DR_{D2U}$ from the device 2 is transmitted to the device 1.

At step 176, the device 1 receives the second update message 172B from the device 2, and the device 2 receives the first update message 172A from the device 1, thus creating a conflict as to the particular data record that was simultaneously updated. The device 2, which was previously designated as the master, examines the D2SP value transmitted in the update message 172A from the device 1 and determines that there is a conflict since the D2SP value stored at the device 2 is greater than the D2SP value transmitted in the update message 172A from the device 1. Because the device 2 has been designated as the master, the device 2 will simply ignore the conflicting update message 172A from the device 1. Conversely, the device 1, which was previously designated as the slave, examines the D1SP value transmitted in the update message 172B from the device 2 and determines that there is a conflict since the D1SP value stored at the device 1 is greater than the D1SP value transmitted in the update message 172B from the device 2. Because the device 1 has been designated as the slave, the device 1 will then accept the updated data record from the device 2—$DR_{D2U}$—and will decrement the stored D1SP value at the device 1 so that it is the same value as the D1SP value transmitted in the update message 172B. Thus, the conflict has been resolved and the devices 1 and 2 are synchronized based on the update message 172B from the device 2.

Figure 22:
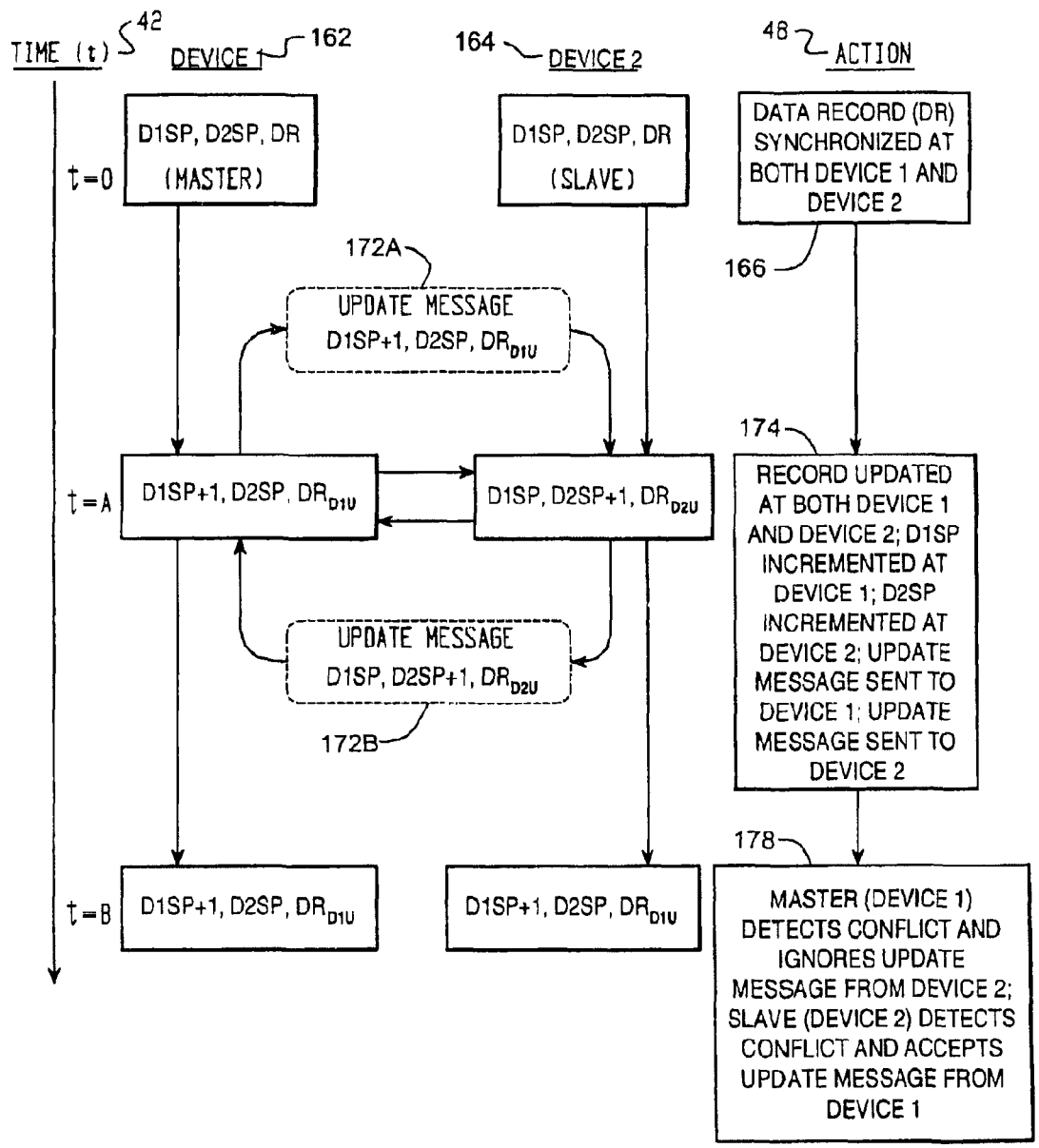
FIG. 22 is a timing flow diagram showing another method of data record synchronization and conflict resolution between two portable communication devices, wherein the data record is simultaneously updated at both portable communication devices.

FIG. 22 is a timing flow diagram showing another method of data record synchronization and conflict resolution between two communication devices. In this figure, the device 1 is designated as the master, and the device 2 is the slave. The sequence of actions shown in FIG. 22 is identical to that shown in FIG. 21, except that the device 1, as the master, controls in any conflict situation. At time t=B (step 178) the net result is that the update message 172A from the device 1 is accepted by the device 2, and the updated device record from the device 1 ($DR_{D1U}$) is written to the device 2 database 14B. In addition, the device 2 decrements the D2SP value to be consistent with the D2SP value contained in the update message 172A from the master device 1.

Synchronization operations executed between a plurality of devices and hosts will now be described. FIG. 19B is a schematic of a data record modified in accordance with another embodiment of the present invention in which data records 160 are synchronized between a plurality of host systems 22A, 22B, 22C and portable data communication devices 12A, 12B and 12C. This modified data record 160 may have a different structure depending upon where it is stored. FIG. 19B shows the structure of the modified data record 160 stored at any device 12 which is to be synchronized to multiple host systems or devices.

As described above in reference to FIGS. 2A and 2B, if a device 12 is being synchronized to two host systems (host 1 and host 2), a data record stored at the device would include a device synchronization parameter for host 1 ($DSP_{H1}$), a host 1 synchronization parameter (H1SP), a device synchronization parameter for host 2 ($DSP_{H2}$), and a host 2 synchronization parameter (H2SP). The synchronization pair $DSP_{H1}$/H1SP is used to synchronize the device 12 to host 1, and the synchronization pair $DSP_{H2}$/H2SP is used to synchronize the device to host 2. Similarly, as shown in FIG. 19B, synchronization parameter pairs are stored for each host system or other device with which a device is to be synchronized.

The example data record 160 in FIG. 19B would be stored at device 1 (12A) when device 1 is to be synchronized with at least host 1 (22A), device 2 (12B) and device M (12C). For each system with which the device 12A is to be synchronized, the data record 160 stored at the device 12A would include a device 1 synchronization parameter and a host or other device synchronization parameter. Thus, the data record 160 in FIG. 19B includes a synchronization parameter pair for host 1 ($D1SP_{H1}$/H1SP), a pair for device 2 ($D1SPD_2$/D2SP) and a pair for device M ($D1SP_{DM}$/DMSP). A parameter pair would also be stored in each data record in the device 1 database 14A for any other host systems or devices with which the device 1 is to be synchronized. Each other host system and device preferably stores only the specific parameter pair corresponding to the particular host or device, such that a data record corresponding to the data record 160 in FIG. 19B would be stored at host 1 with only the pair $D1SP_{H1}$/H1SP, at device 2 with only the pair $D1SPD_2$/D2SP and at device M with only the pair $D1SP_{DM}$/DMSP.

Figure 23:
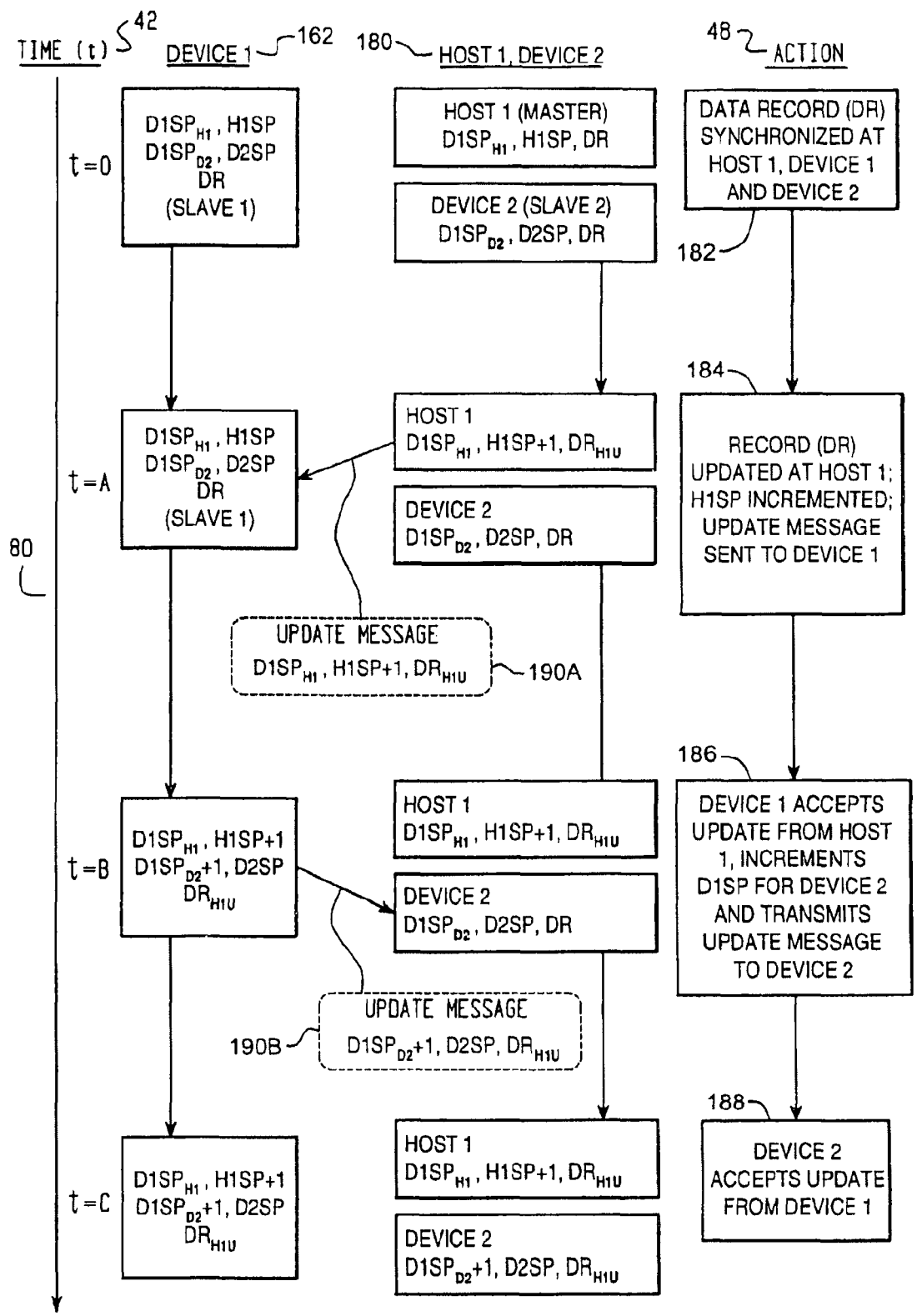
FIG. 23 is a timing flow diagram showing a method of data record synchronization between a host system and a plurality of portable communication devices, wherein the data record is updated at the master host system.

FIG. 23 is a timing flow diagram showing a method of data record synchronization between device 1 (12A) and a plurality of systems, including for illustrative purposes host 1 (22A) and device 2 (12B), wherein a data record is updated at the master system, assumed to be host system 1 in FIG. 23. As noted above, in the embodiment of the invention where more than one host or device is being synchronized to the device 1, it is useful to have a two-level master-slave architecture in which one of the systems (host 1) is the master, the device 1 is a first level slave, and any remaining systems (device 2) are second level slaves.

At time t=0 (step 182) the data record to be updated is synchronized at the host 1, device 1, and device 2. This data record has been modified at the device 112A to include the device 1/host 1 synchronization parameter pair $D1SP_{H1}$/H1SP and the device 1/device 2 synchronization parameter pair $D1SPD_2$/D2SP. The corresponding data record at host 122A includes the device 1/host 1 synchronization parameter pair $D1SP_{H1}$/H1SP and the corresponding data record at device 212B has been modified to include the device 1/device 2 synchronization parameter pair $D1SPD_2$/D2SP).

At time t=A, the data record is updated at host 122A to $DR_{H1U}$, and the host 1 synchronization parameter (H1SP) is incremented to H1SP+1. An update message 190A is then transmitted from host 122A to the device 112A. This update message 190A includes the device 1 synchronization parameter for host 1 ($D1SP_{H1}$), the new host 1 synchronization parameter (H1SP+1), and the updated data record ($DR_{H1U}$).

The device 1 receives the update message 190A at time t=B (step 186), and examines the $D1SP_{H1}$ value to determine if there is a conflict. Since the $D1SP_{H1}$ value from the host is the same as the $D1SP_{H1}$ value stored at the device 1, no conflict is detected, and thus the device 1 accepts the update message 190A from host 1. In so doing, the data record stored at the device 1 database 14A is updated to be $DR_{H1U}$, and the host 1 synchronization parameter (H1SP) stored at the device 1 is incremented to H1SP+1. Because the data record has been updated at the device 1, the device synchronization parameters ($D1SP_{D2}$) for any other synchronized systems (device 2 in this example) that did not initiate the update message 190A are incremented, and another update message 190B is generated. A second update message 190B is transmitted from the device 1 to device 2, and includes the new device synchronization parameter ($D1SP_{D2}$+1), the corresponding synchronization parameter for device 2 (D2SP), and the updated data record ($DR_{H1U}$) that was transmitted from the master host system (host 1) 22A. Where more than one other host system or device is to be synchronized with device 1, a second update message is prepared at device 1 and sent to each such other system or device.

At step 188, device 2 receives the second update message 190B and first determines whether a conflict exists by comparing the transmitted device 2 synchronization parameter (H2SP) with that stored at device 2. Assuming no conflict exists, the device 2 accepts the changes from the update message, increments the corresponding device synchronization parameter $D1SP_{D2}$, and stores $DR_{H1U}$ as the updated data record. In this manner, an update at host 1 is synchronized to both the device 1 and device 2. Other host systems or devices may be synchronized with host 1, device 1 and device 2 in a similar manner.

Figure 24:
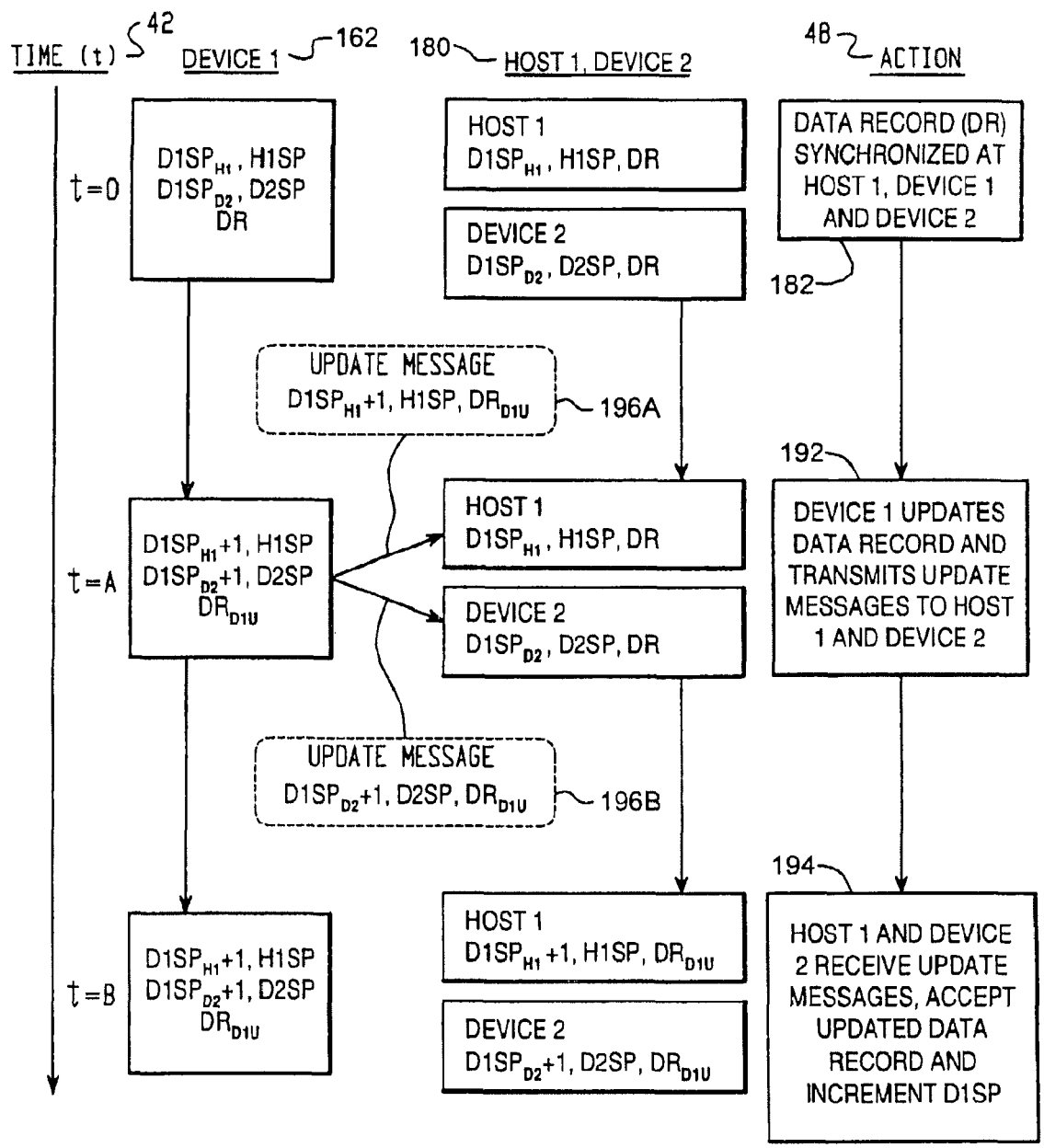
FIG. 24 is a timing flow diagram showing a method of data record synchronization between a host system and a plurality of portable communication devices, wherein the data record is updated at a first-level slave portable communication device.

FIG. 24 is a timing flow diagram showing a method of data record synchronization between a device (device 1), a host (host system 1) and another device (device 2), wherein a data record is updated at device 1. At step 182, the data record to be updated is synchronized at device 1, host 1 and device 2. As described above, the device 1 includes data records modified to include synchronization parameter pair for each system with which it is being synchronized. The respective synchronized systems (host 1 and device 2 in this example) include data records modified to include the respective synchronization parameter pair (either $D1SP_{H1}$, H1SP or $D1SPD_2$, D2SP).

At step 192, the device 1 updates the data record DR to $DR_{D1U}$, and increments both device 1 synchronization parameters $D1SP_{H1}$, $D1SPD_2$. Then, the device 1 generates two update messages, one (196A) for host 1, and another (196B) for device 2. The update message 196A transmitted to host 1 includes the incremented D1SP for host 1, the host 1 synchronization parameter (H1SP) stored at the device 1, and the updated data record $DR_{D1U}$. Likewise, the update message 196B transmitted to device 2 includes the incremented D1SP for device 2, the device 2 synchronization parameter (D2SP) stored at the device 2, and the updated data record $DR_{D1U}$.

At step 194, the host 1 and device 2 receive the update messages 196A, 196B and examine the respective synchronization parameters in the update message 196A, 196B to determine if any conflict exists. Assuming that there is no conflict, the host 1 and device 2 accept the update information by storing $DR_{D1U}$ as the new data record and incrementing the respective locally stored device synchronization parameters $D1SP_{H1}$, $D1SP_{D2}$.

Figure 25:
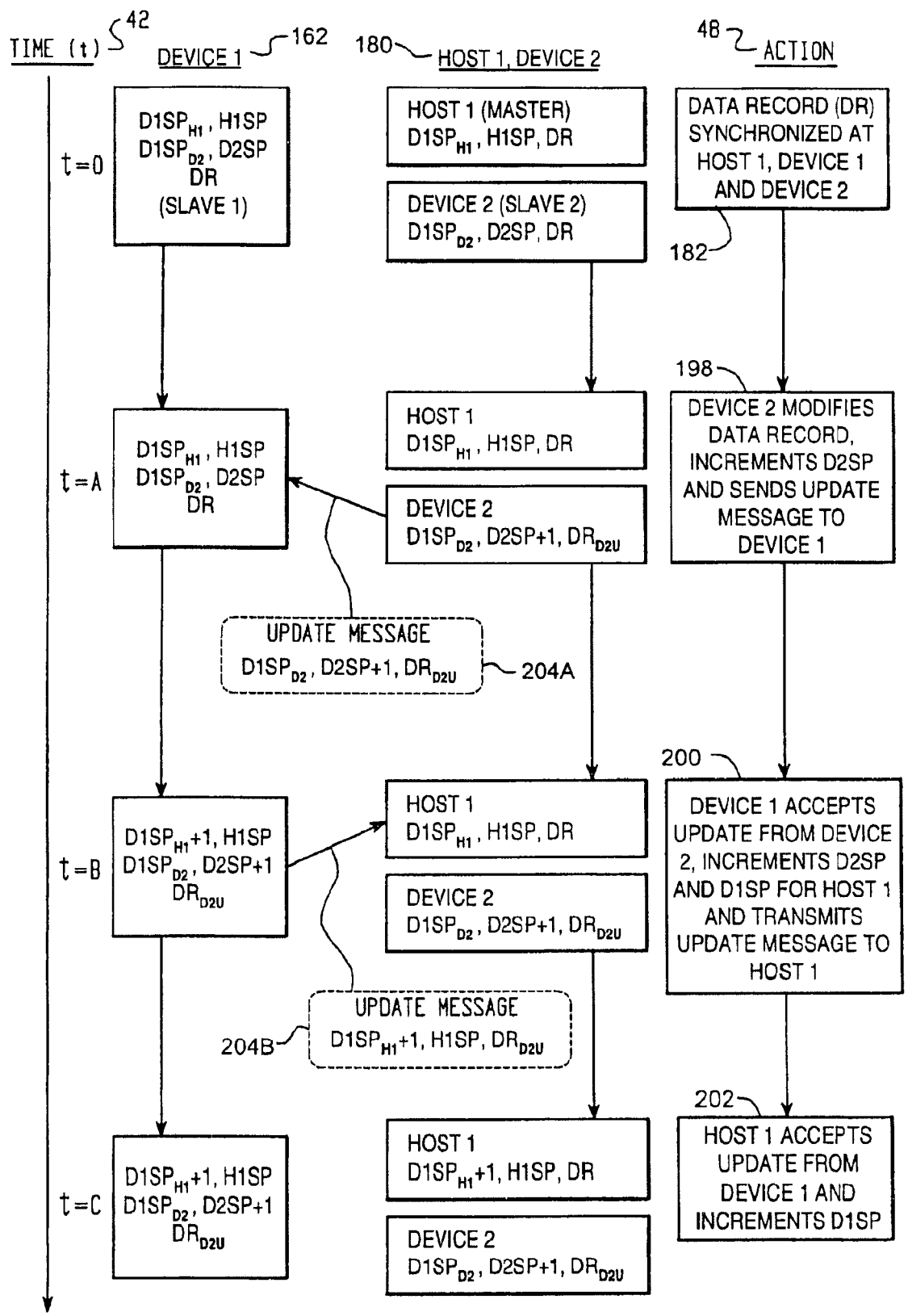
FIG. 25 is a timing flow diagram showing a method of data record synchronization between a host system and a plurality of portable communication devices, wherein the data record is updated at a second-level slave device.

FIG. 25 represents a method of data record synchronization between a plurality of systems, including device 1, host 1 and device 2, as in previous examples. In FIG. 25 however, a data record is updated at a second-level slave system, device 2. Recall from the description above that the master-slave architecture of the present invention may designate a master and first and second level slaves.

At step 182, the host 1, device 1 and device 2 are synchronized. At step 198, the second-level slave (device 2) updates a particular data record DR to $DR_{D2U}$. The corresponding synchronization parameter D2SP is incremented to D2SP+1, and an update message 204A is transmitted from the second-level slave (device 2) to the first level slave (device 1), including the D1SP for device 2, the updated D2SP, and the updated data record $DR_{D2U}$.

At step 200, the first-level slave device 1 receives the update message 204A and verifies that there is no conflict by comparing the transmitted D1SP for device 2 ($D1SPD_2$) with the $D1SPD_2$ stored at the device 1 for this particular data record. Assuming there is no conflict (i.e., the $D1SPD_2$ values are the same), the device 1 accepts the new data record $DR_{D2U}$ and increments the D2SP synchronization parameter at the device 1 to be the same as that stored at host 2. Having updated its data record, the device 1, as a first-level slave to the master (host 1), then increments the D1SP for host 1 ($D1SP_{H1}$) and transmits a second update message 204B to host 1 including the incremented device 1 synchronization parameter ($D1SP_{H1}$+1), the host synchronization parameter for host 1 (H1SP), and the updated data record from device 2 ($DR_{D2U}$). The master host 1 then verifies that no conflict exists by comparing the host-side H1SP with the H1SP transmitted in the update message 204B. Assuming that there is no conflict, at step 202 the host 1 accepts the updated data record $DR_{D2U}$, and increments the device 1 synchronization parameter $D1SP_{H1}$ so that it is synchronized with the device 1.

Figure 26:
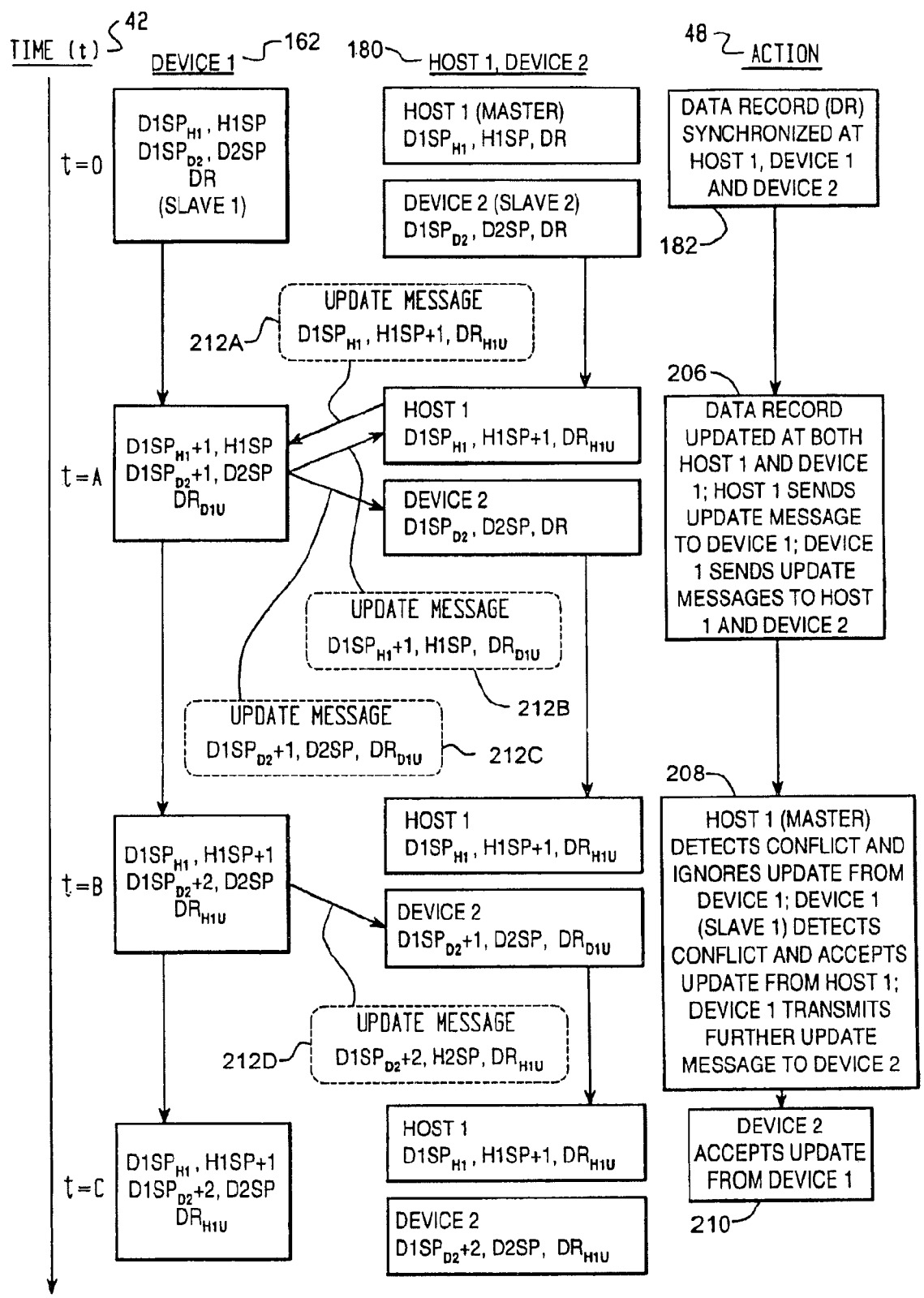
FIG. 26 is a timing flow diagram showing a method of data record synchronization and conflict resolution between a host system and a plurality of portable communication devices, wherein the data record is simultaneously updated by the master host system and a portable communication device.

FIG. 26 is a timing diagram showing a method of data record synchronization and conflict resolution between host system 1, device 1 and device 2, wherein a data record is simultaneously updated by the master, assumed to be host 1, and device 1. As above, at step 182 the data record to be updated is synchronized at host 1, device 1 and device 2. At step 206, the data record is simultaneously updated at the master (host 1) and at the slave device 1. The master (host 1) updates the data record to $DR_{H1U}$, increments the host 1 synchronization parameter (H1SP), and transmits to device 1 an update message 212A that includes the updated data record ($DR_{H1U}$), the updated host 1 synchronization parameter (H1SP), and the device 1 synchronization parameter for host 1 $D1SP_{H1}$ that is stored at the host 1 database 24A. Likewise, the slave device 1 updates data record to $DR_{D1U}$, increments the device 1 synchronization parameters for host 1 ($D1SP_{H1}$) and device 2 ($D1SP_{D2}$), and transmits two update messages containing this information, one message 212B containing the host 1 synchronization information, and a second message 212C containing the device 2 synchronization information.

At step 206, host 1 receives the update message 212B from the slave device 1 and detects a conflict since the transmitted host 1 synchronization parameter (H1SP) in the message 212B is less than the H1SP stored at the host 1 database. Therefore, since the host 1 is the master in this example, the update message 212B from the slave device 1 is ignored. At the same time, level 2 slave device 2 also receives the update message 212C from the slave device 1. At device 2 however, there is no conflict, and thus device 2 accepts the update message 212C, stores the new data record $DR_{D1U}$, and increments the device 1 synchronization parameter stored at host 2 ($D1SP_{D2}$). Also at the same time, the device 1 receives the update message 212A from the master host 1. The device 1 detects the conflict by comparing the transmitted $D1SP_{H1}$ to the $D1SP_{H1}$ stored at the device 1, which was previously incremented. Detecting the conflict, the slave device 1 accepts the updated data record $DR_{H1U}$ from the host, increments the host 1 synchronization parameter (H1SP), and decrements the D1SP value for host 1 ($D1SP_{H1}$) so that it is synchronized with the $D1SP_{H1}$ value stored at the host 1 database. In addition, because the data record has been updated a second time at the device 1, the D1SP for device 2 ($D1SPD_2$) is incremented again to $D1SPD_2$+2, and another update message 212D is transmitted to device 2 including the new data record $DR_{H1U}$, the updated D1SP ($D1SPD_2$), and the device 2 synchronization parameter (D2SP).

Finally, at step 210, device 2 receives the update message 212D and stores the updated data record $DR_{H1U}$ in its database. The device 1 synchronization parameter at device 2 ($D1SP_{H2}$) is then incremented so that it is in synchronization with the D1SP for device 2 stored at the device 1.

Data record synchronization, whether between a single device and one or more host systems, between multiple devices or between multiple devices and one or more hosts should now be apparent from the foregoing description. The addition and deletion of new data records to a device or host database, using either embedded or explicit commands, will preferably be accomplished substantially as described above in conjunction with FIGS. 10-17. Although FIGS. 10-17 relate to data record addition and deletion for device-to-host database synchronization systems, data record addition and deletion for other synchronization arrangements will be similar, with the exception of particular synchronization parameters. For example, for a device-to-device database synchronization system, the DSP and HSP shown in FIG. 10 will be different DSPs, such as D1SP and D2SP.

Figure 27:
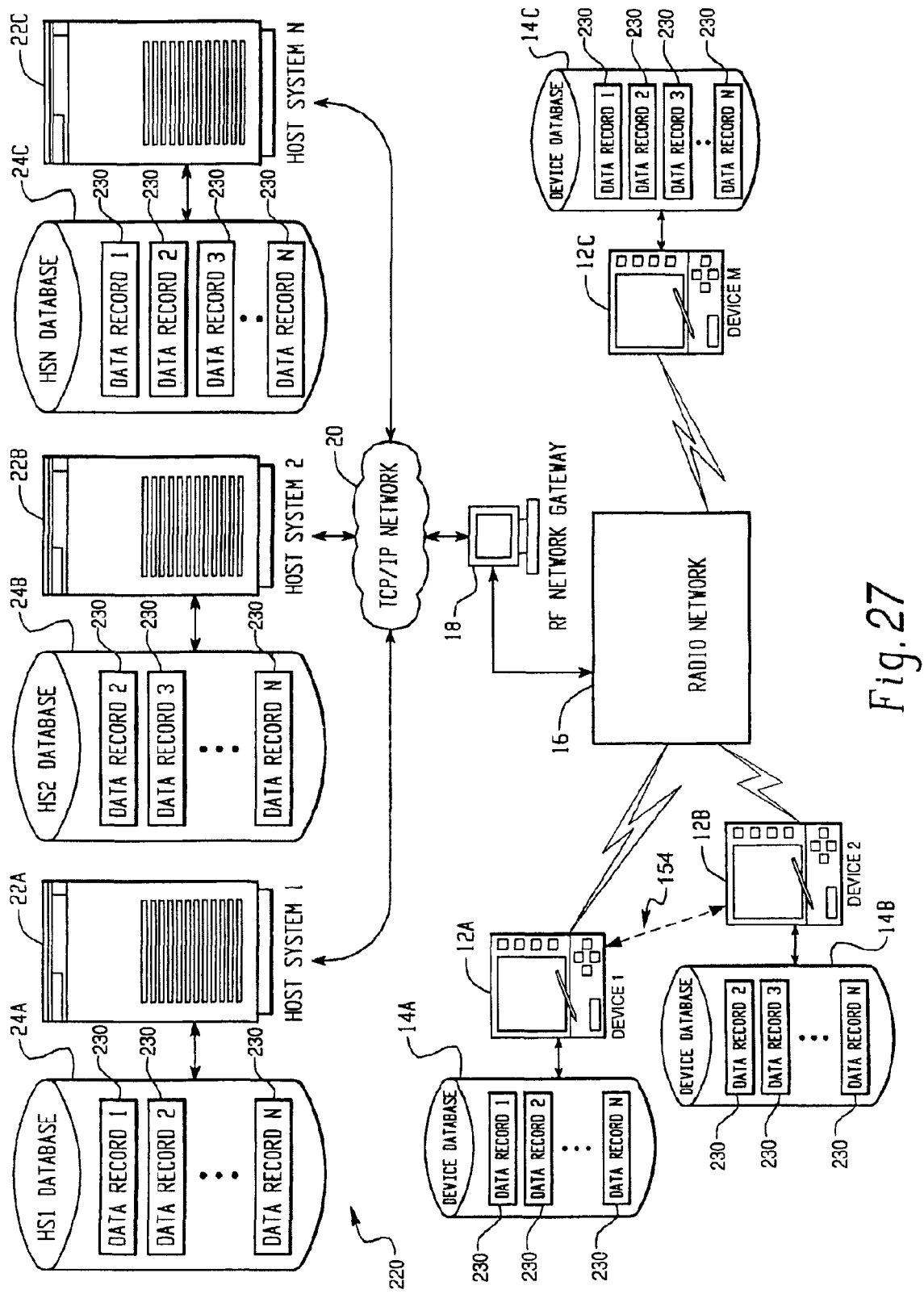
FIG. 27 is a diagram of a preferred system for synchronizing data records between a plurality of host system and device databases via a wireless network, according to a further embodiment of the invention.

In the above embodiments of the invention, although data records are updated, added and deleted one at a time, the entire databases within which the data records occur are synchronized. That is, as shown in FIGS. 1 and 18, all of the databases 24A-24C and 14 (FIG. 1) or 14A-14C (FIG. 18) contain corresponding data records. The synchronization parameters associated with the same data record in different databases may vary, but the data fields within corresponding data records are preferably the same. FIG. 27 shows a synchronization system 220 in which common data records may be synchronized between databases which include additional different data records.

The system 220 in FIG. 27 is substantially the same as the systems in FIGS. 1 and 18, except for the content of the various databases. As shown in FIG. 27, data record 1 occurs in the databases 24A (host system 1), 14A (device 1), 24C (host system N) and 14C (device M), data record 2 is stored in all of the databases, and data record 3 exists only in databases 24 B (host system 2), 14B (device 2), 24C (host system N) and 14 C (device M). The system 220 synchronizes these data records in all databases in which they occur.

Although the data records stored in host databases 24A-24C are the same as those stored in the device databases 14A-14C respectively, FIG. 27 is merely an illustrative embodiment of the invention. Data record synchronization may instead be even less structured, allowing for synchronization of a data record between any device or host and any other device or host. The embodiment shown in FIG. 27 represents a system in which each device 12 is associated with a host device 24. For example, each device may be a hand-held mobile communication device which a user may from time to time connect to a host system such as a desktop computer to synchronize data records on the device with those on the host. A synchronization system in accordance with the invention ensures that the user's data records as stored on the device remain synchronized with those stored at the host and thereby does not require the user to connect a device to a host system. Any changes made at the device or the host will be reflected at the host or device.

It should also be noted that the databases 24C and 12C, respectively associated with host system N and device M, include all of the data records stored in all other databases within the system. This feature is also purely illustrative, but provides for central databases, one associated with a host system and another associated with a device, of all data records in the synchronization system. The host system 22C may for example be a messaging server in a local area network or corporate network for example, in which the other host systems 22A and 22B are configured to operate. Each host system has its own database, which may include data records such as a mailbox items, calendar appointments, tasks, reminders and the like, which may also be stored in the central databases 24C and 14C. When planning a meeting for example, a user may wish to access one of the central databases to determine when the meeting attendants may be available.

The data records 230, as shown in FIGS. 28A-28D, have the same general format as the records 30 and 160, characterized by one or more data fields 32, one or more of which may be reserved for a data record identifier for example, followed by a series of synchronization parameters. The particular synchronization parameters stored in any data record may differ depending upon where the data record is stored. FIGS. 28A-28D illustrate a possible format for data record 1 in each database in which it is stored.

Figure 28:
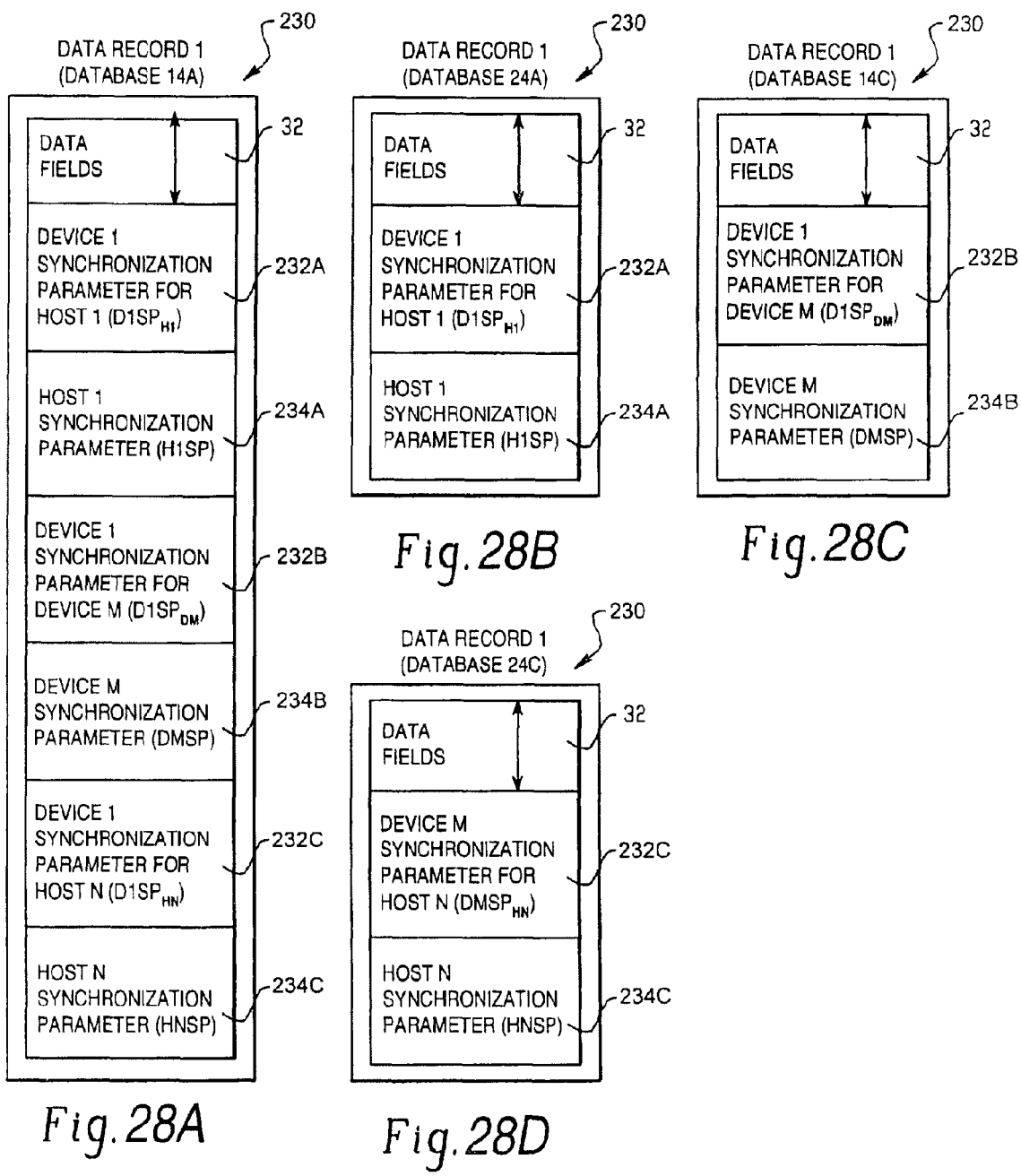
FIGS. 28A-D are schematic diagrams of versions of the same data record as stored in different databases and modified to operate in accordance with the embodiment of the invention shown in FIG. 27, in which data records are synchronized between databases which may store different data records.

In FIG. 28A, data record 1 is stored with a device 1 synchronization parameter for host 1 ($D1SP_{H1}$) 232A, a host 1 synchronization parameter (H1SP) 234A, a device 1 synchronization parameter for device M ($D1SP_{DM}$) 232B, a device M synchronization parameter (DMSP) 234B, a device 1 synchronization parameter for host N ($D1SP_{HN}$) 232C, and a host N synchronization parameter (HNSP) 234C. The pair 232A/234A provides for synchronization of data record 1 between the device 1 and its associated host 1, whereas the pairs 232B/234B and 232C/234C respectively provide for synchronization of data record 1 between device 1 and device M and between device 1 and host N. The data record 1 will therefore be updated at the host 1 database, the device M database and the host N database according to one of the methods described above when any changes are made to data record 1 at the device 1.

At the host 1 database 24A however, data record 1 is stored with only $D1SP_{H1}$ and H1SP (FIG. 28B). FIGS. 28C and 28D show similar formats for data record 1. Similarly, the device and host synchronization parameter pair 232B/234B is stored at the device M database 14C and the pair 232C/234C is stored at the host N database 24C.

Update methods and synchronization system operations have been described in detail above, and therefore need be described only briefly below.

If data record 1 is updated at host 1, H1SP is incremented, an update message is sent to the device 1, and provided there is no conflict, the data record is updated at device 1. This update at device 1 initiates a further update process between device 1 and both the device M and host N, whereby, in the absence of a conflict, data record 1 is similarly updated at device M and host N. All instances of data record 1 in the synchronization system are thereby updated to reflect a change at host 1. Any changes to data record 1 at host N (or device M) are similarly propagated to all systems and devices storing a copy of data record 1. An update at host N (or device M) results in an update at device 1, which will be reflected at both device M (or host N) and host 1. For updates of data record 1 at device 1, update messages are sent to host 1, device M and host N, substantially as described above.

These update operations assume that no conflict is detected. When an update conflict does occur however, the conflict resolution preferably proceeds as described above. In the example of FIGS. 28A-28D, if host 1 is designated the master, then device 1 acts as a first-level slave and both host N and device M are second-level slaves. Where device 1 is the master however, all other systems (host 1, device M and host N) are slaves. The conflict resolution process for such master-slave arrangements may be substantially as described above.

Designation of a single master system may not be appropriate, particularly in systems such as shown in FIG. 27, where a number of systems with different databases are involved in synchronization operations. One possible solution in accordance with an aspect of the invention is that master designation may instead be data record specific. For example, as described above, a data record may be assigned an identifier, which may include an equipment or user identification number such as a device PIN, when it is first created. Thereafter, the particular system (host or a device) which created the record is deemed to be the master when a conflict is detected. If data record 1 was created at device 1 for example, then device 1 automatically designated the master for data record 1. A master for a particular data record might instead be selected by a user when a data record is created. In the above example where data record 1 is created at device 1, the user of device 1 might designate host 1 as the master for data record 1 when the data record is created. If desired, a mechanism may be provided whereby a master-slave designation, whether automatic or user-selected, may be over-ridden. When a user over-rides a master designation, the new master designation might be made only for a particular update or may be made effective indefinitely, unless or until the new designation is over-ridden again.

Since no conflicts are possible for data record add operations, new data records are replicated throughout all databases in which the data record is to be stored. However, in synchronization systems such as system 220, in which synchronization is dependent upon data records and not the database in which it is stored (i.e. data records may be synchronized between databases which store different sets of data records), a new data record must include some indication regarding to which databases the data record is to be added. Such information would preferably be provided by a user when the data record is created. It is contemplated that a user may specify a user identifier such as a name or email address when a data record is created, and software on or accessible by the device or host at which the data record is added is able to translate each such identifier into a database location or identifier. Add or update messages may then be prepared and sent to any systems associated with each database to which the new data record is to be added.

Data record deletion is the simplest operation in a record-specific synchronization system. No conflicts are possible, and a system at which a data record is deleted need only prepare and send appropriate delete or update messages to systems for which synchronization parameters are stored in its local database.

The data record formats shown in FIGS. 28A-28D are intended for illustrative purposes only. Data record-based synchronization systems such as shown in FIG. 27 may use the data record formats shown in FIGS. 28A-28D, but the invention is in no way limited thereto. For example, the device 1 version of data record 1 shown in FIG. 28A is longer than the version stored at its associated host system (FIG. 28B) and therefore occupies more memory space. Since computer systems such as the host systems 22 will typically have more memory than the portable devices 12, it may be desirable to configure the synchronization system such that each device stores only synchronization parameters corresponding to its associated host and the host stores the longer data record, including synchronization parameters for all systems in which the data record is to be synchronized.

Having described synchronization systems and methods according to various embodiments of the invention, an illustrative example of a device for which database or data record synchronization may be desired will now be described. A block diagram of such a device is shown in FIG. 29.

Figure 29:
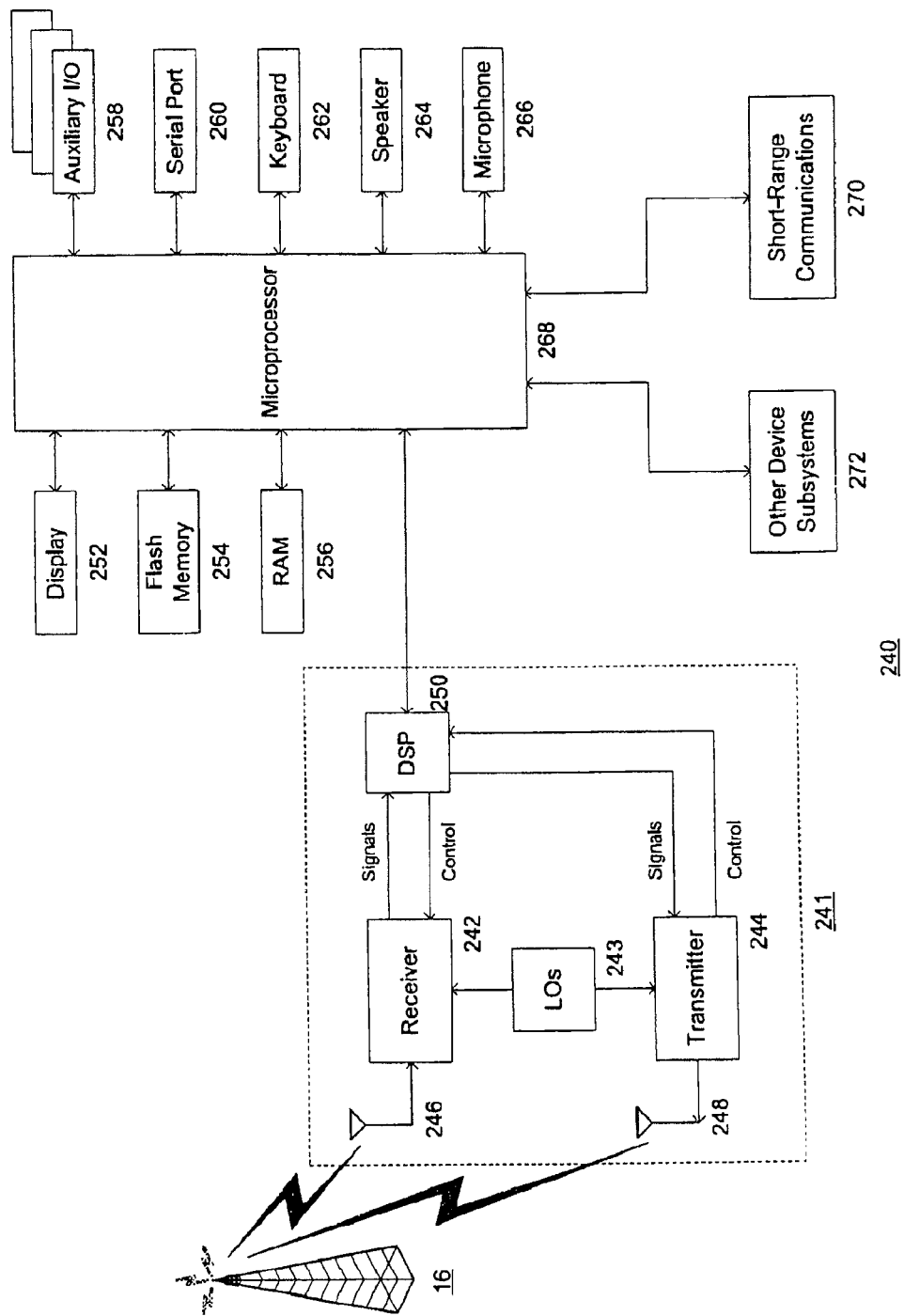
FIG. 29 is a block diagram of a portable communication device which may be implemented in a synchronization system according to one of the various embodiments of the invention.

FIG. 29 is a block diagram of a mobile communication device 240 in which the instant invention may be implemented. The mobile communication device 240 is preferably a two-way communication device having at least voice and data communication capabilities. The device preferably has the capability to communicate with other computer systems, such as a host system 22, on the Internet. Depending on the functionality provided by the device, the device may be referred to as a data messaging device, a two-way pager, a cellular telephone with data messaging capabilities, a wireless Internet appliance or a data communication device (with or without telephony capabilities).

Where the device 240 is enabled for two-way communications, the device will incorporate a communication subsystem 241, including a receiver 242, a transmitter 244, and associated components such as one or more, preferably embedded or internal, antenna elements 246 and 248, local oscillators (LOs) 243, and a processing module such as a digital signal processor (DSP) 250. As will be apparent to those skilled in the field of communications, the particular design of the communication subsystem 241 will be dependent upon the communication network in which the device is intended to operate. For example, a device 240 destined for a North American market may include a communication subsystem 241 designed to operate within the Mobitex™ mobile communication system or DataTAC™ mobile communication system, whereas a device 240 intended for use in Europe may incorporate a GPRS communication subsystem 241.

Network access requirements will also vary depending upon the type of network 16. For example, in the Mobitex and DataTAC networks, mobile devices such as 240 are registered on the network using a unique personal identification number or PIN associated with each device. In GPRS networks however, network access is associated with a subscriber or user of a device 240. A GPRS device therefore requires a subscriber identity module (not shown), commonly referred to as a SIM card and described briefly above, in order to operate on a GPRS network. Without a SIM card, a GPRS device will not be fully functional. Local or non-network communication functions (if any) may be operable, but the device 240 will be unable to carry out any functions involving communications over network 16. When required network registration or activation procedures have been completed, a device 240 may send and receive communication signals over the network 16. Signals' received by the antenna 246 through a communication network 16 are input to the receiver 242, which may perform such common receiver functions as signal amplification, frequency down conversion, filtering, channel selection and the like, and in the example system shown in FIG. 29, analog to digital conversion. Analog to digital conversion of a received signal allows more complex communication functions such as demodulation and decoding to be performed in the DSP 250. In a similar manner, signals to be transmitted are processed, including modulation and encoding for example, by the DSP 250 and input to the transmitter 244 for digital to analog conversion, frequency up conversion, filtering, amplification and transmission over the communication network 16 via the antenna 248.

The DSP 250 not only processes communication signals, but also provides for receiver and transmitter control. For example, the gains applied to communication signals in the receiver 242 and transmitter 244 may be adaptively controlled through automatic gain control algorithms implemented in the DSP 250.

The device 240 preferably includes a microprocessor 268 which controls the overall operation of the device. Communication functions, including at least data and voice communications, are performed through the communication subsystem 241. The microprocessor 268 also interacts with further device subsystems such as the display 252, flash memory 254, random access memory (RAM) 256, auxiliary input/output (I/O) subsystems 258, serial port 260, keyboard 262, speaker 264, microphone 266, a short-range communications subsystem 270 and any other device subsystems generally designated as 272.

Some of the subsystems shown in FIG. 29 perform communication-related functions, whereas other subsystems may provide "resident" or on-device functions. Notably, some subsystems, such as keyboard 262 and display 252 for example, may be used for both communication-related functions, such as entering a text message for transmission over a communication network, and device-resident functions such as a calculator or task list.

Operating system software used by the microprocessor 268 is preferably stored in a persistent store such as flash memory 254, which may instead be a read only memory (ROM) or similar storage element (not shown). Those skilled in the art will appreciate that the operating system, specific device applications, or parts thereof, may be temporarily loaded into a volatile store such as RAM 256. It is contemplated that received communication signals may also be stored to RAM 256. The device database may also be stored in the RAM 256.

The microprocessor 268, in addition to its operating system functions, preferably enables execution of software applications on the device. A predetermined set of applications which control basic device operations, including at least data and voice communication applications for example, will normally be installed on the device 240 during manufacture. A preferred application that may be pre-loaded onto the device may be a personal information manager (PIM) application having the ability to organize and manage data items relating to the device user such as, but not limited to e-mail, calendar events, voice mails, appointments, and task items. Naturally, one or more memory stores would be available on the device to facilitate storage of PIM data items on the device. Such PIM application would preferably have the ability to send and receive data items, via the wireless network. In a preferred embodiment, the PIM data items are seamlessly integrated, synchronized and updated, via the wireless network, with the device user's corresponding data items stored or associated with a host computer system, as described above. Further applications may also be loaded onto the device 240 through the network 16, an auxiliary I/O subsystem 258, serial port 260, short-range communications subsystem 270 or any other suitable subsystem 272, and installed by a user in the RAM 256 or preferably a non-volatile store (not shown) for execution by the microprocessor 268. Such flexibility in application installation increases the functionality of the device and may provide enhanced on-device functions, communication-related functions, or both. For example, secure communication applications may enable electronic commerce functions and other such financial transactions to be performed using the device 240.

In a data communication mode, a received signal such as a text message or web page download will be processed by the communication subsystem 241 and input to the microprocessor 268, which will preferably further process the received signal for output to the display 252, or alternatively to an auxiliary I/O device 258. A user of device 240 may also compose data items such as email messages for example, using the keyboard 262, which is preferably a complete alphanumeric keyboard or telephone-type keypad, in conjunction with the display 252 and possibly an auxiliary I/O device 258. Such composed items may then be transmitted over a communication network through the communication subsystem 241.

For voice communications, overall operation of the device 240 is substantially similar, except that received signals would preferably be output to a speaker 264 and signals for transmission would be generated by a microphone 266. Alternative voice or audio I/O subsystems such as a voice message recording subsystem may also be implemented on the device 240. Although voice or audio signal output is preferably accomplished primarily through the speaker 264, the display 252 may also be used to provide an indication of the identity of a calling party, the duration of a voice call, or other voice call related information for example.

The serial port 260 in FIG. 29 would normally be implemented in a personal digital assistant (PDA)-type communication device for which synchronization with a user's desktop computer such as a host system 22 (not shown in FIG. 29) may be desirable, but is an optional device component. Such a port 260 would enable a user to set preferences through an external device or software application and would extend the capabilities of the device by providing for information or software downloads to the device 240 other than through a wireless communication network 16. The alternate download path may for example be used to load an encryption key onto the device through a direct and thus reliable and trusted connection to thereby enable secure device communication.

A short-range communications subsystem 270 is a further optional component which may provide for communication between the device 240 and different systems or devices, which need not necessarily be similar devices. For example, the subsystem 270 may include an infrared device and associated circuits and components or a Bluetooth communication module to provide for communication with similarly-enabled systems and devices. The short-range communication subsystem enables device-to-device communication as indicated at 154 in FIG. 18.

Preferred embodiments of the invention described with reference to the attached drawing figures are presented only to demonstrate certain examples of the invention. Other elements, steps, methods and techniques that are insubstantially different from those described above and/or in the appended claims are also intended to be within the scope of the invention.

For example, other devices and systems may also be operating within a communication system in which a synchronization system according to one of the several embodiments of the invention is implemented. These other devices need not included databases or data records to be synchronized; the synchronization functionality preferably does not impede communication with non-synchronized devices and systems. Although a device such as 12 may store data records to be synchronized with a host system such as 22A, the device 12 will remain a fully functional communication device. Where device 12 is a hand-held email device, a cellular telephone, a multi-function communication device as described above or a communication-enabled PDA for example, device communication functionality is not affected by enabling device database or data record synchronization. Similarly, where a host system is a desktop computer, any network, email, messaging or other communication functions are unaffected by implementation of synchronization functions, by installing synchronization software at the host system for example. The host system may still communicate with other host systems, devices, network servers and the like, regardless of whether or not an intended recipient or other party to such communications is enabled for database or data record synchronization.

Furthermore, in the above illustrative examples, the various synchronization parameters are incremented by 1 when a data record is changed. Provided that a synchronization parameter is increased, such that a recipient of an update message may determine that database sync parameter in an update message is greater than a corresponding stored synchronization parameter, other increments are also possible. For example, it is contemplated that in a database synchronization system, as described above in reference to FIGS. 1-26, a database synchronization parameter, or effectively a version number, may be assigned to the various synchronized databases when the entire databases are first synchronized, such as indicated at step 50 in FIG. 3. This database parameter is then incremented and used as a new synchronization parameter when a data record in the database is updated. Alternatively, a current version number may be used as a new synchronization parameter value and then incremented. The synchronization parameter is thereby increased when a data record is changed, but the increment may be greater than one. The database parameter or version number may then also be used to determine if any changes have been made to synchronized databases since the last preceding synchronization of the entire databases, i.e. when a device is directly connected to an associated host system. If the host and device database version numbers have not changed, then an entire database synchronization operation need not be performed.

What is claimed:

1. A secure data record synchronization system, comprising:
   a host system coupled to a host database, wherein the host database stores data records that include a first host-synchronization-parameter and a first device-synchronization-parameter;
   the host system being configured to generate a first update message that is encrypted and transmitted over a network to a portable data communication device when a first data record is updated at the host system, the first update message including the first host-synchronization-parameter, the first device-synchronization-parameter, and the updated first data record;
   wherein the portable data communication device includes a device database that stores data records that include a second host-synchronization-parameter and a second device-synchronization-parameter;
   the host system being further configured to receive from the portable data communication device a second update message, the second update message being generated and encrypted by the portable data communication device and being transmitted to the host system when a second data record is updated at the portable data communication device, the second update message including the second host-synchronization-parameter, the second device-synchronization-parameter, and the updated second data record.

2. The system of claim 1, wherein conflicts between changes made in the host database and the device database are resolved in favor of propagating the change made in the host database.

3. The system of claim 1, wherein conflicts between changes made in the host database and the device database are resolved in favor of propagating the change made in the device database.

4. The system of claim 1, wherein the updated first data record or the updated second data record may include a new data record.

5. The system of claim 1, wherein updates to the first or second data record include deletion of a data record.

6. A secure data record synchronization system, comprising:
   a portable data communication device that includes a device database for storing data records that include a first host-synchronization-parameter and a first device-synchronization-parameter;
   the portable data communication device being configured to generate a first update message that is encrypted and transmitted over a network to a host system when a first data record is updated at the portable data communication device, the first update message including the first host-synchronization-parameter, the first device-synchronization-parameter, and the updated first data record;
   wherein the host system is coupled to a host database that stores data records that include a second host-synchronization-parameter and a second device-synchronization-parameter;
   the portable data communication device being further configured to receive from the host system a second update message, the second update message being generated and encrypted by the host system and transmitted over the network to the portable data communication device when a second data record is updated at the host system, the second update message including the second host-synchronization-parameter, the second device-synchronization-parameter, and the updated second data record.

7. The system of claim 6, wherein conflicts between changes made in the host database and the device database are resolved in favor of propagating the change made in the host database.

8. The system of claim 6, wherein conflicts between changes made in the host database and the device database are resolved in favor of propagating the change made in the device database.

9. The system of claim 6, wherein the updated first data record or the updated second data record may include a new data record.

10. The system of claim 6, wherein updates to the first or second data record include deletion of a data record.

11. A method of synchronizing date records between a host system and a portable data communication device, comprising:
    generating, at the host system, a first update message that is encrypted and transmitted over a network to the portable data communication device when a first data record is updated at the host system, the first update message including a first host-synchronization-parameter, a first device-synchronization-parameter, and an updated first data record; and
    receiving, at the host system from the portable data communication device, a second update message, the second update message being generated and encrypted by the portable data communication device and being transmitted to the host system when a second data record is updated at the portable data communication device, the second update message including a second host-synchronization-parameter, a second device-synchronization-parameter, and an updated second data record.

12. The method of claim 11, wherein conflicts between changes made at the host system and at the portable data communication device are resolved in favor of propagating the change made at the host system.

13. The method of claim 11, wherein conflicts between changes made at the host system and at the portable data communication device are resolved in favor of propagating the change made at the portable data communication device.

14. The method of claim 11, wherein the updated first data record or the updated second data record may include a new data record.

15. The system of claim 11, wherein updates to the first or second data record include deletion of a data record.

16. A method of synchronizing date records between a portable data communication device and a host system, comprising:
    generating, at the portable data communication device, a first update message that is encrypted and transmitted over a network to the host system when a first data record is updated at the portable data communication device, the first update message including a first host-synchronization-parameter, a first device-synchronization-parameter, and an updated first data record; and
    receiving, at the portable data communication device from the host system, a second update message, the second update message being generated and encrypted by the host system and transmitted over the network to the portable data communication device when a second data record is updated at the host system, the second update message including a second host-synchronization-parameter, a second device-synchronization-parameter, and an updated second data record.

17. The method of claim 16, wherein conflicts between changes made at the host system and at the portable data communication device are resolved in favor of propagating the change made at the host system.

18. The method of claim 16, wherein conflicts between changes made in the host system and at the portable data communication device are resolved in favor of propagating the change made at the portable data communication device.

19. The method of claim 16, wherein the updated first data record or the updated second data record may include a new data record.

20. The method of claim 16, wherein updates to the first or second data record include deletion of a data record.

* * * * *

UNITED STATES PATENT AND TRADEMARK OFFICE
CERTIFICATE OF CORRECTION

| | | |
|---|---|---|
| PATENT NO. | : 8,131,672 B2 | Page 1 of 1 |
| APPLICATION NO. | : 12/171787 | |
| DATED | : March 6, 2012 | |
| INVENTOR(S) | : Hind et al. | |

It is certified that error appears in the above-identified patent and that said Letters Patent is hereby corrected as shown below:

Column 34, line 21, please change "date records" to -- data records --

Column 34, line 53, please change "date records" to -- data records --

Signed and Sealed this
Twenty-fourth Day of July, 2012

David J. Kappos
*Director of the United States Patent and Trademark Office*